(12) United States Patent
Tilley et al.

(10) Patent No.: US 9,471,050 B2
(45) Date of Patent: Oct. 18, 2016

(54) SOLAR TRACKER AND RELATED METHODS, DEVICES, AND SYSTEMS

(71) Applicant: Questar Energy Systems, Issaquah, WA (US)

(72) Inventors: Herbert Alan Tilley, Issaquah, WA (US); Gregory William Robinson, Covington, WA (US); Edwin Eugene McKenzie, III, Seattle, WA (US)

(73) Assignee: WOVN, INC., Issaquah, WA (US)

( * ) Notice: Subject to any disclaimer, the term of this patent is extended or adjusted under 35 U.S.C. 154(b) by 497 days.

(21) Appl. No.: 13/815,913

(22) Filed: Mar. 15, 2013

(65) Prior Publication Data

US 2014/0196761 A1    Jul. 17, 2014

Related U.S. Application Data

(60) Provisional application No. 61/752,922, filed on Jan. 15, 2013.

(51) Int. Cl.
 *F24J 2/54* (2006.01)
 *G05B 15/02* (2006.01)
 (Continued)

(52) U.S. Cl.
 CPC .................. *G05B 15/02* (2013.01); *F24J 2/38* (2013.01); *F24J 2/542* (2013.01); *G05F 1/67* (2013.01); *G06Q 30/0283* (2013.01);
 (Continued)

(58) Field of Classification Search
 CPC ... H01L 31/052; H01L 31/18; H01L 31/048; F24J 2/54

USPC ................ 126/576, 572, 601; 136/246, 251; 359/850, 853
See application file for complete search history.

(56) References Cited

U.S. PATENT DOCUMENTS

| 603,317 A | 5/1898 | Calver |
|---|---|---|
| 4,146,785 A | 3/1979 | Neale |

(Continued)

FOREIGN PATENT DOCUMENTS

| KR | 100819861 B1 | 4/2008 |
|---|---|---|
| KR | 1020100102402 A | 9/2010 |

(Continued)

OTHER PUBLICATIONS

International Search Report and Written Opinion for International Application PCT/US2014/011700; Applicant Questar Energy Systems, Inc.; Mail Date May 7, 2014, 22 pages.

*Primary Examiner* — Gregory Huson
*Assistant Examiner* — Nikhil Mashruwala
(74) *Attorney, Agent, or Firm* — Perkins Coie LLP

(57) ABSTRACT

Aspects of the disclosure are directed to a solar tracker assembly. In one embodiment, the assembly includes a base having a track, a centrally-positioned base member, a motor operably coupled to the base member, and a plurality of arms extending from the base member towards the track, with the track including a plurality of arcuate members that are assembled to form the track. A rotatable frame is coupled to the arms and has one or more towers and an actuator positioned on the one or more towers. A pivoting frame is coupled to the one or more towers, with the pivoting frame configured to carry a solar panel array. In operation, the motor can rotate the base member and arms around a Z-axis to position the rotatable frame at azimuth and the actuator can move the pivoting frame around an X-Y axis to position the pivoting frame at zenith.

9 Claims, 18 Drawing Sheets

(51) Int. Cl.
  *G05F 1/67* (2006.01)
  *G06Q 30/02* (2012.01)
  *F24J 2/38* (2014.01)
  *H02S 20/10* (2014.01)
(52) U.S. Cl.
  CPC .............. H02S 20/10 (2014.12); H02S 20/32 (2014.12); *F24J 2002/5479* (2013.01); *Y02E 10/47* (2013.01); *Y10T 29/49355* (2015.01)

(56) References Cited

U.S. PATENT DOCUMENTS

| | | | |
|---|---|---|---|
| 4,215,410 A | 7/1980 | Weslow et al. | |
| 4,408,595 A | 10/1983 | Broyles et al. | |
| 4,440,155 A | 4/1984 | Maloof et al. | |
| 4,794,909 A | 1/1989 | Eiden | |
| 5,022,929 A | 6/1991 | Gallois-Montbrun | |
| 5,852,814 A | 12/1998 | Allen | |
| 6,485,152 B2 | 11/2002 | Wood | |
| 7,274,975 B2 | 9/2007 | Miller | |
| 7,783,390 B2 | 8/2010 | Miller | |
| 7,884,279 B2 | 2/2011 | Dold et al. | |
| 7,890,436 B2 | 2/2011 | Kremen | |
| 8,019,445 B2 | 9/2011 | Marhoefer | |
| 8,129,667 B2 | 3/2012 | Moore et al. | |
| 8,166,709 B2 | 5/2012 | Gonzalez Moreno | |
| 8,242,634 B2 | 8/2012 | Schatz et al. | |
| 8,264,195 B2 | 9/2012 | Takehara et al. | |
| 8,359,124 B2 | 1/2013 | Zhou et al. | |
| 2001/0036024 A1* | 11/2001 | Wood | F24J 2/10 359/853 |
| 2002/0179138 A1* | 12/2002 | Lawheed | F24J 2/085 136/246 |
| 2003/0201008 A1 | 10/2003 | Lawheed | |
| 2005/0033707 A1 | 2/2005 | Ehlers et al. | |
| 2005/0197991 A1 | 9/2005 | Wray et al. | |
| 2007/0290651 A1 | 12/2007 | McNulty et al. | |
| 2008/0011288 A1 | 1/2008 | Olsson | |
| 2009/0032089 A1* | 2/2009 | Chen | F24J 2/542 136/251 |
| 2009/0084429 A1 | 4/2009 | Sureda Alsina et al. | |
| 2009/0188488 A1 | 7/2009 | Kraft et al. | |
| 2009/0260619 A1 | 10/2009 | Bailey et al. | |
| 2009/0313090 A1 | 12/2009 | Armstrong et al. | |
| 2010/0012113 A1 | 1/2010 | Martin Barbero | |
| 2010/0024861 A1 | 2/2010 | Cabanillas Saldana | |
| 2010/0082171 A1 | 4/2010 | Takehara et al. | |
| 2010/0191489 A1 | 7/2010 | Zolot | |
| 2011/0028365 A1 | 2/2011 | Buitrago | |
| 2011/0030672 A1 | 2/2011 | Olsson | |
| 2011/0233157 A1* | 9/2011 | Kmita | F24J 2/5233 211/41.1 |
| 2012/0130556 A1 | 5/2012 | Marhoefer | |
| 2012/0211001 A1 | 8/2012 | Elshafei | |
| 2012/0266938 A1 | 10/2012 | Goei et al. | |
| 2014/0352686 A1* | 12/2014 | Blumenthal | F24J 2/12 126/714 |
| 2014/0352757 A1* | 12/2014 | Ramirez | H02S 20/30 136/246 |

FOREIGN PATENT DOCUMENTS

| | | |
|---|---|---|
| WO | 2007125867 A1 | 11/2007 |
| WO | 2008155652 A2 | 12/2008 |

\* cited by examiner

Nodal Operations and Maintenance

Node Financial/Accounting Interface

*System Log:*

| 12:00 am | |
|---|---|
| Summary report for June 20th 2017 | |
| SCAN installed | 3000 |
| Installed capacity | 87,480 kW |
| SCAN maintenance | 3 |
| Offline capacity | -98 kW |
| SCAN active | 2997 |
| Active capacity | 87,392.52 kW |
| SCAN installed | 4 |
| Installed SCAN capacity | 119 kW |
| Total SCAN installed | 3004 |
| Total installed capacity | 87,599 kW |
| Forecast report for June 21st 2017: | |
| SCAN installed | 3004 |
| Installed capacity | 87,599 kW |
| SCAN maintenance | 6 |
| Offline capacity | -175 kW |
| SCAN active | 2998 |
| Active capacity | 87,424 kW |
| Projected generation | 1,049,088 kWh |
| Projected Capacity factor | 50.0% (12 sun hours) |

| 6:00 am | |
|---|---|
| Current conditions: | |
| clear sky, local marine fog Grid segments W23 – W45 | |
| average wind speed 4 mph SE | |
| 12% cloud coverage | |
| 69 degrees | |
| 31% humidity | |
| Power: | |
| Total Generation | 43,712 MWh |
| Current Storage | 18.9 MWh |
| Storage output | 3.0 MW (15%) |
| Ancillary services: | |
| 12 KVAR | |
| Island requests | 4 (power outage E23) |
| Load shedding requests | 0 |

| 12:01 am | |
|---|---|
| Current conditions: | |
| clear sky | |
| average wind speed 7 mph SSE | |
| 0% cloud coverage | |
| 72 degrees | |
| 32% humidity | |
| Power: | |
| Total Generation | 0 kWh (0%) |
| Current Storage | 40 MWh |
| Current Storage Discharge | 5.2 MWh (13%) |
| Ancillary services: | |
| 90 KVAR | |
| Island requests | 0 |
| Load shedding requests | 0 |

| 12:00 pm | |
|---|---|
| Current conditions: | |
| clear sky, local marine fog Grid segments W23 – W22 | |
| average wind speed 8 mph SE | |
| 4% cloud coverage | |
| 85 degrees | |
| 34% humidity | |
| Power: | |
| Total Generation | 611,968 kWh |
| Current Storage | 32.9 MWh |
| Storage output | 1.5 MWh (4.5%) |
| Ancillary services: | |
| Power factor requests | 22 KVAR |
| Island requests | 2 (power outage E23) |
| Load shedding requests | 6 (121 kWh) |

*Fig. 7*

SOLAR TRACKER AND RELATED METHODS, DEVICES, AND SYSTEMS

CROSS-REFERENCE TO RELATED APPLICATION

The present application claims priority to U.S. Provisional Application No. 61/752,922, filed Jan. 15, 2013, which is incorporated herein by reference in its entirety.

TECHNICAL FIELD

The following disclosure relates generally to energy distribution systems. Some embodiments, for example, are directed to methods for managing information and/or operation of power or communication nodes connected to end-users, distribution grids, and/or power generators.

BACKGROUND

In a typical energy distribution system, a power plant produces energy with a power generator, such as a coal or gas fired generator, a hydro-powered generator, or a nuclear-powered generator. Power is then transmitted to an end user over a transmission grid. The transmission grid, in turn, supplies this power to a local distribution grid which supplies the power to end users via low-voltage transmission lines, substations, distribution circuits, etc. A utility company can meter the power at the end-user's premises to determine how much power has been consumed.

One problem with traditional energy distributions is they employ antiquated transmission and distribution grids. This makes it difficult and cost prohibitive for utility companies to bring new and alternative power generators online, such as wind, solar, geothermal, etc. Another problem with these systems is that they centralize power distribution, which gives utility companies a market monopoly. Thus, many utility companies are reluctant to improve their power distribution infrastructure.

BRIEF DESCRIPTION OF THE DRAWINGS

FIG. 7 show various system logs than can be generated by a node manager during a single day of operation of a solar tracker in accordance with an embodiment of the present technology.

DETAILED DESCRIPTION

As described in greater detail below, the technology disclosed herein relates to energy systems and, in particular, to a node manager configured to manage information and/or operation of various aspects of an energy distribution system.

Figure 1:
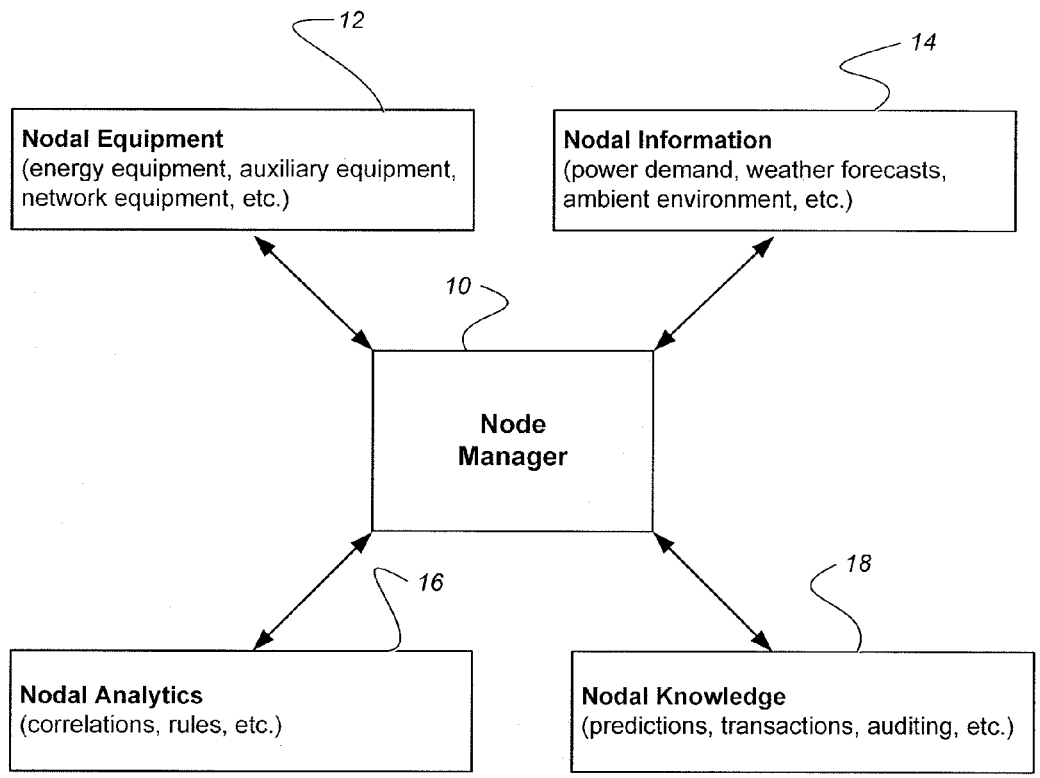
FIG. 1 is a block diagram of a system that includes a node manager configured in accordance with an embodiment of the present technology.

FIG. 1 is an overview block diagram showing the operational relationships of a node manager 10 in accordance with an embodiment of the present technology. In general, the node manager 10 is configured to manage information and/or operation at one or more nodes in a power distribution system, such as power distribution nodes (e.g., a substation), end-user user nodes (e.g., a residential, commercial, governmental, or other suitable users), and/or communication nodes (e.g., a server, database, etc.).

In one aspect, the node manager 10 communicates with or is integrated with one or more nodal equipment 12 (e.g., nodal devices) at or in the vicinity of a node. As described in greater detail below, the nodal equipment 12 can include, for example, energy equipment (e.g., a solar array), auxiliary equipment (e.g., a load balancer), and/or network equipment (e.g., a database).

In another aspect, the node manager 10 operates to receive nodal information 14. In one embodiment, the nodal information 14 can include information relevant to a particular node or a number of nodes. For example, the resource information can relate to power demand, weather forecasts, and/or the ambient environment in the vicinity of the nodal devices.

In yet another aspect, the node manager 10 operates to derive nodal analytics 16 based on the nodal information 14. In one embodiment, the node manager 10 can derive the nodal analytics 16 based on various correlations in the nodal information 14. For example, the node manager 10 can correlate power demand with the weather forecast and/or the ambient environment. In some embodiments, the node manager 10 generates nodal analytics 16 based on various rules. The node manager 10 can use these rules to develop new or modified correlations, rules, and/or other analytics.

In still yet another aspect, the node manager 10 operates to generate nodal knowledge 18 based on the nodal information 12 and the nodal analytics 16. The nodal knowledge 18, for example, can allow a power utility to predict power demand based on a weather forecast. In some embodiments, the nodal knowledge 18 can be bought, sold, or licensed according to a variety of transaction models. In other embodiments, the nodal knowledge 18 can be used for auditing purposes.

In general, the nodal equipment includes devices, apparatuses, systems, etc. that incorporate a node manager. Nodal equipment 12 can be located, for example, at a power distribution node (e.g., a substation), an end-user user node (with e.g., a residential, commercial, governmental, etc.), and/or a communication node (e.g., a server, database, etc.). In some embodiments the nodal equipment 12 operates independently of a node manager. In other embodiments, the nodal equipment 12 allows a node manager to handle nodal information, analytics, and/or knowledge. As described in greater detail below, the nodal equipment 12 can include energy equipment, auxiliary equipment, and/or network equipment. However, nodal equipment 12 can include other types of equipment, devices, apparatus, etc. For example, the nodal equipment 12 can include a mobile phone, a personal computer, and/or a remote controller device that incorporate a node manager.

Nodal energy equipment generally includes equipment that is configured to supply and/or store energy (e.g., with a bank of batteries, fuel cells, compressed air, etc.). Nodal energy equipment can include, for example, conventional generators (e.g., coal, gas-fired, hydro-powered, nuclear, etc.) and/or renewable energy generators (solar, wind, geothermal, hydro-powered, etc.). In some embodiments, nodal energy equipment can both deliver and store energy. For example, in a smart grid, an electric or hybrid car can receive and store energy from the grid and provide energy back to the grid to meet peak demand, load balance, etc.

Figure 2A:
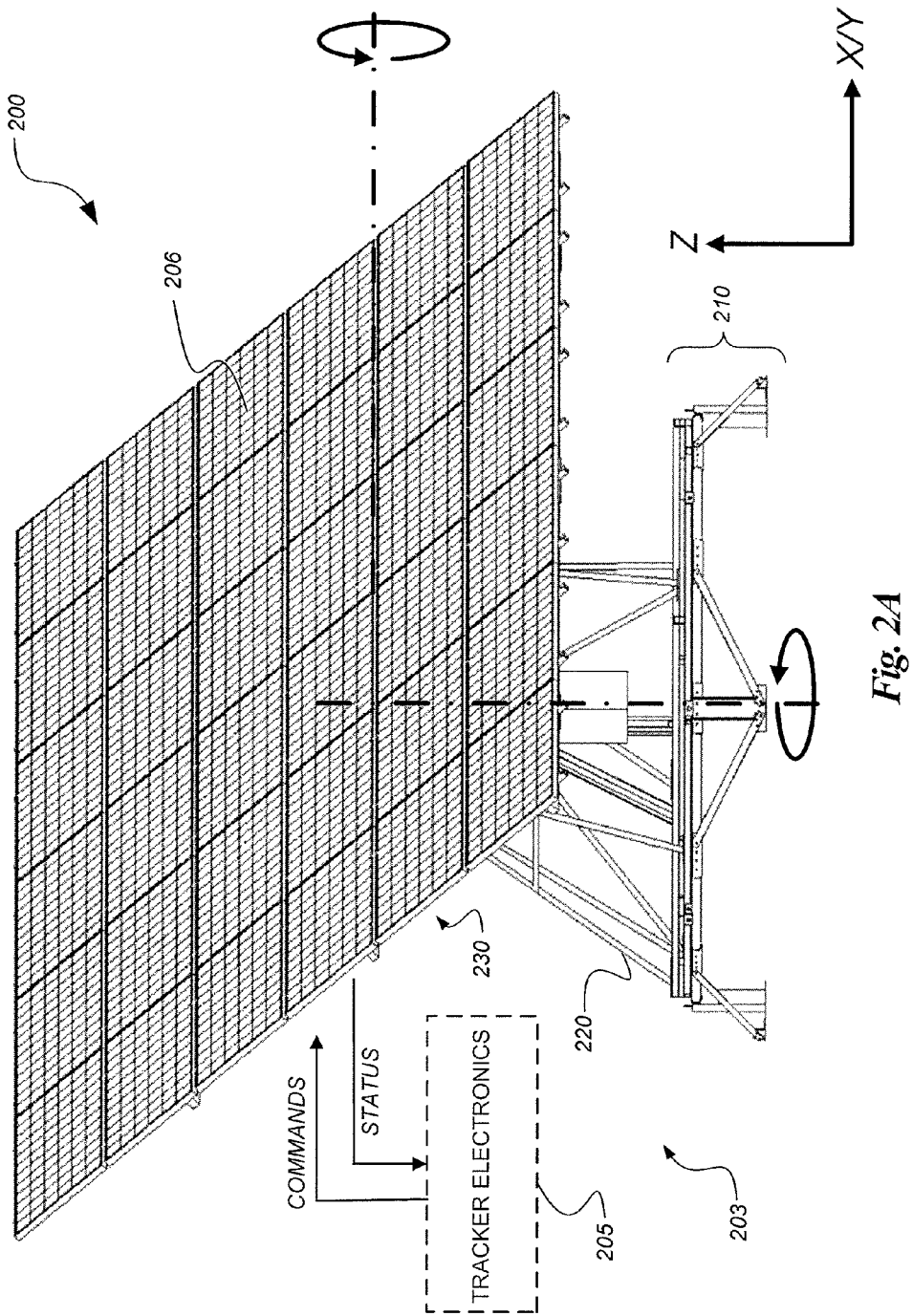
FIG. 2A is an isometric view of a solar tracker system configured in accordance with an embodiment of the present technology.

As described herein, nodal energy equipment is described in the context of a solar tracker system or equipment 200 ("tracker 200"; FIG. 2A). In other embodiments, however, other types of nodal energy equipment are possible. Further, some aspects of the tracker 200 can be configured to provide other advantages. For example, the mechanical, operational, as well as the other aspects of the tracker 200 can provide certain advantages relevant to equipment for harvesting solar energy generally.

FIG. 2A is an isometric view of a tracker 200 configured in accordance with an embodiment of the present technology. The tracker 200 includes a tracker assembly 203 and tracker electronics 205 (shown schematically) operably coupled to the tracker assembly 203. The tracker assembly 203 includes a base 210, a rotatable frame 220, and a pivoting frame 230 suitable to carry a solar panel array 206 (e.g., one or more solar panels of photovoltaic cells). Various aspects of the base 210, the rotatable frame 220, the pivoting frame 230 and associated motor(s) and actuator(s) are described in greater detail with reference to FIGS. 2A-2E together.

Figure 2B:
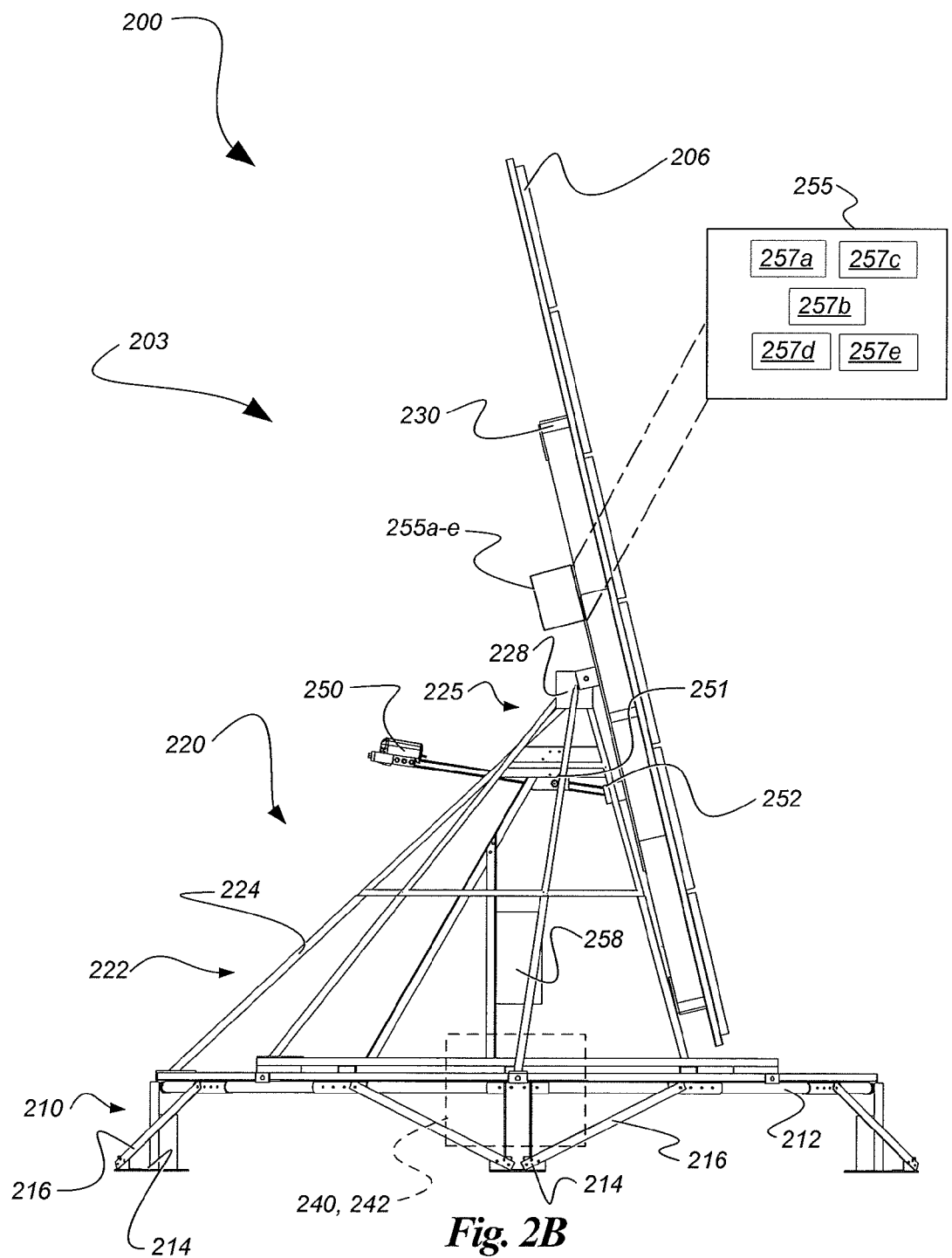
FIG. 2B is a side view of a tracker and a tracker assembly configured in accordance with embodiments of the present technology.
Figure 2C:
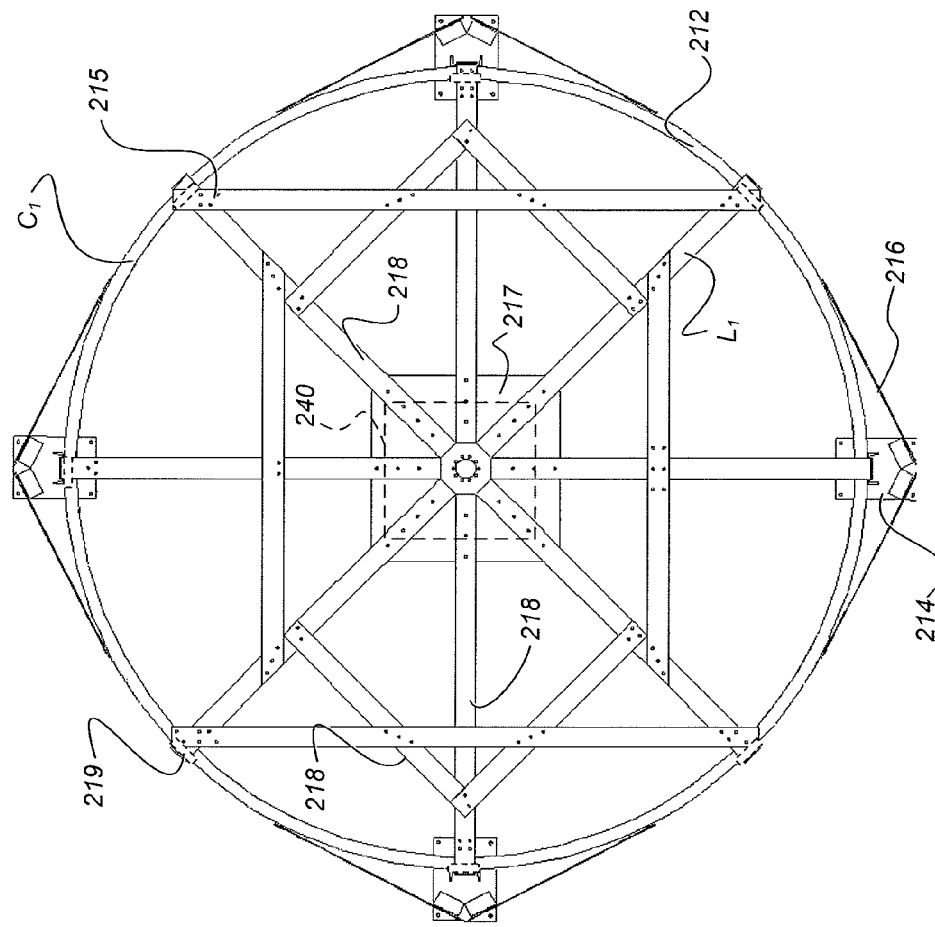
FIG. 2C is a top plan view of a base configured in accordance with embodiments of the present technology.

FIG. 2B is a side view of a tracker 200 and tracker assembly 203 and FIG. 2C is a top plan view of the base 210 configured in accordance with embodiments of the present technology. In reference to FIGS. 2B and 2C together, the base 210 can include a track member 212 supported by a plurality of foot plates 214. In one embodiment, the track member 212 can be a frame (e.g., metal tubing frame) having a symmetrical (e.g., round, circular, etc.) shape with an outer circumference $C_1$. The foot plates 214 can, for example, be metal footings configured to support the track member 212 above the ground or other surface and to anchor the tracker 200 to the ground or other surface. The foot plates 214 can be secured to the track member 212 around the circumference $C_1$ of the track member 212. In some embodiments, additional support members 216 (e.g., angled support bars or straps) can couple the track member 212 to the foot plates 214.

Referring to FIG. 2C, the base 210 can also include a motor 240 (e.g., a slew motor; drawn in phantom) on which a base member 217 can be fixed. The motor 240 can be configured with support structures (not shown) and configured to rotationally turn the base member 217 around a Z-axis (e.g., azimuth, FIG. 2A) with respect to the track member 212. In one particular embodiment, the motor 240 can include a slew motor from Kinematics Manufacturing, Inc., of 21410 N. 15$^{th}$ Lane, 104, Phoenix, Ariz. 85027. The base member 217 includes radially extending arms 218 coupled thereto. The radially extending arms 218 can include wheels 219 (drawn in phantom) for engaging and moving along the track member 212. For example the individual wheels can be attached at a distal end 215 of each arm 218 such that each individual arm 218 has an arm length $L_1$ that extends between the base member 217 and the track member 212. Also, the wheels can ride on a round tube to minimize friction and minimize dirt/dust accumulation on the track. Minimal surface contact between the wheels and the track allows wheels to cut grass or other plants that grow over the track, negating the need to significantly alter the landscape surrounding the tracker. The wheels can be made from a pipe surrounding low friction bearings to minimize the torque on the centralized slewing drive, allowing the use of a smaller, less expensive slewing drive. The wheels can also be made from a pipe long enough to still contact the track if any settling or anomalies occur that cause the track to be not perfectly circular.

The motor 240 can drive rotation (e.g., in either direction around the Z-axis) of the base member 217 (e.g., using a drive shaft; not visible in FIG. 2C) such that the wheels 219 fixed to the radially extending arms 218 move along the track member 212. In some embodiments, the motor 240 and/or drive shaft can include bearings or other friction-reducing members or coatings like Teflon®.

Figure 2D:
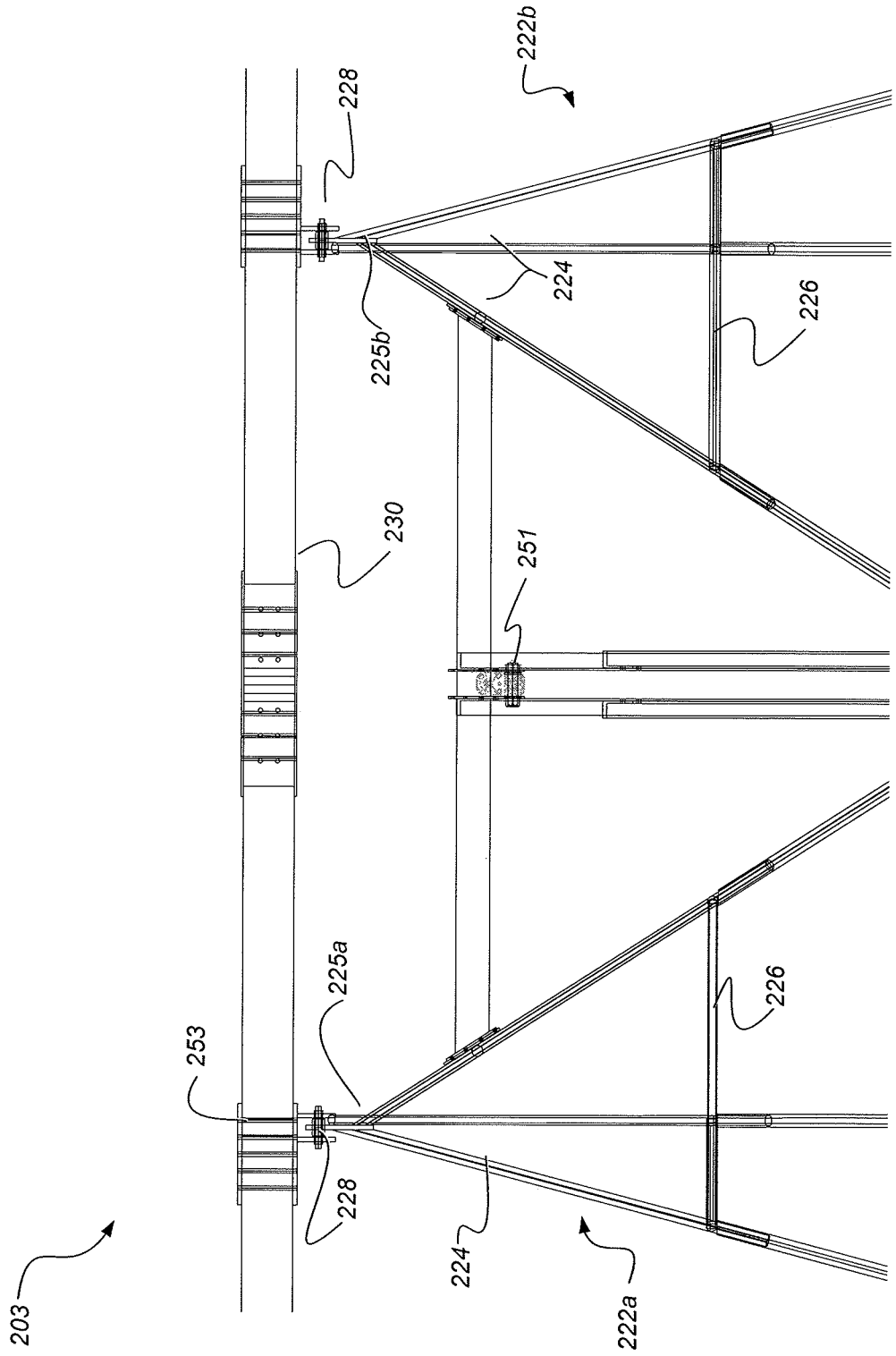
FIG. 2D is a partial backside view of a tracker assembly configured in accordance with an embodiment of the present technology.

FIG. 2D is a partial backside view of a tracker assembly 203 configured in accordance with an embodiment of the present technology. Referring to FIGS. 2B and 2D together, the tracker assembly 203 also includes a rotatable frame 220 having towers 222a and 222b (referred to together as 222) coupled to the base 210 (e.g., to the arms 218). Each tower 222 includes a plurality of frame members 224 interconnected by bars 226 (e.g., such as metal tubing). The frame members 224 can be coupled, at one end (e.g., a first end), to the arms 218 of the base 210. The frame members 224 can culminate (e.g., at a second end) at a tower peak 225a and 225b where a hinge 228 is provided for pivotally attaching the pivoting frame 230. The rotatable frame 220 can also include the actuator 250 (as best seen in FIG. 2B), such as a linear actuator) for engaging and moving (e.g., pivoting) the pivoting frame 230 with respect to the rotatable frame 220 and around the X-Y axis (FIG. 2A). The actuator 250 can be coupled to the rotatable frame 220 and move with respect to the rotatable frame via pins 251, 252 (only the pin 251 is visible in FIG. 2D) around which the actuator 250 can pivot (e.g., pivot about 90°). In one particular embodiment, the actuator 250 can include a linear actuator from Linak, Inc., of 2200 Stanley Gault Parkway, Louisville, Ky. 40223.

The pivoting frame 230 can be configured to carry, orient, position, or otherwise hold a solar panel array 206 (e.g., via a unistrut attachment 253). The solar panel array 206 can comprise a plurality of photovoltaic cells suitable for converting solar energy into electrical energy. In one particular embodiment, the solar panel array 206 can include one or more solar panels (e.g., 240 Watt) from SunPower Corporation, of 77 Rio Robles, San Jose, Calif. 95134. As described above, the pivoting frame 230 can be pivotally coupled to the rotatable frame 220 via the hinges 228.

In one aspect, the tracker assembly 203 is configured to utilize the solar panel array 206 to convert solar energy into electrical energy. During operation, the tracker assembly 203 can receive control signals (FIG. 2A) to move, adjust and position the solar panel array 206 in a desired location and orientation for collecting solar energy. For example, the rotatable frame 220 is arranged with the base 210 such that actuation of the motor 240 turns or rotates the base member 217 and arms 218 in a manner that translates rotation of the rotatable frame 220 around the Z-axis to position azimuth. Additionally, the actuator 250 receives control signals to position the pivoting frame 230 in a manner that the pivoting frame 230 and the rotatable frame 220 together position zenith. For example, the tracker electronics 205 can communicate via the control signals the desired azimuth and zenith angles for positioning (e.g., via the motor 240 and the actuator 250) the solar panel array 206. As such, the tracker 200 is able to position the rotating, pivoting tracker assembly 203 and to generate electrical energy corresponding to the relative position of the solar panel array 206.

In some embodiments, the tracker assembly 203 can transmit the converted electrical energy directly to the tracker electronics 205. In other embodiments, the tracker assembly 203 may transmit at least a portion the electrical energy to other components of the tracker 200 or to remote components. For example, the tracker assembly 203 may transfer a portion of the electrical energy directly to a bank of batteries (not shown) for reserve power.

As described above, the tracker assembly 203 is configured to receive control signals from the tracker electronics 205. In response to some commands, the tracker assembly 203 positions the solar panel array 206 by changing the orientation of the rotatable frame 220 and the pivoting frame 230 via the combination of associated motor(s) (e.g., motor 240) and actuator(s) (e.g., actuator 250). In the embodiment illustrated in FIGS. 2A-2D, for example, the tracker assembly 203 positions the solar panel array 206 by rotation about a Z-axis (e.g., azimuth) in combination with rotation about an X-Y axis (e.g., in the X-Y plane). In response to other commands, the tracker assembly 203 sets operational parameters. For example, the tracker assembly 203 can enable and/or disable the operation of certain cells in the solar panel array 206 in response to the control signals.

In another aspect, the tracker assembly 203 is configured to provide status information to the tracker electronics 205. The status information can include, for example, present orientation of the rotatable frame, the pivoting frame 230, and/or the solar panel array 206. The status information can also include information about the ambient (e.g., of the solar panel array 206, the output voltage (or current) of the solar panel array 206 (or individual cells therein)), operational aspect of the motor and/or actuator (e.g., encoder position, overheat detection, speed sensors, etc.), and ambient information (e.g., humidity, sunlight, temperature, wind speed, etc.) in the vicinity of the tracker assembly 203. Status information can also relate to the overall status of the tracker, such as whether maintenance is required (e.g., when a motor has malfunctioned, a circuit board needs to be replaced, etc.).

Additionally the base 210 supports stable mounting of the solar panel array 206 in a fail safe manner. For example, the tracker 200 can include instructions for detection of imbalances and/or other mechanical issues that would create tipping or other unstable scenarios in conventional trackers. These imbalances and other issues could be addressed rapidly by the tracker assembly 203 by moving the solar panel array (e.g., pivoting frame 230) into a stable position (e.g., horizontal position, vertical position, in-line with a wind direction, etc.) in real-time.

In one embodiment, many of the sensors 257a-257e (referred to together as 257) can be located at a sensor box 255 that can be attached at or near the pivoting frame 230 or, in other embodiments, near to the actuator 250 (e.g., linear actuator). The sensors 257 can be located at the interior and/or exterior of the sensor box 255 and can include, for example, a heat sensor 257a (e.g., for detecting a temperature reading at the solar panel array 206 or elsewhere), a light sensor 257b, an accelerometer 257c, a compass sensor 257d (e.g., for detecting tilt azimuth), and a position sensor 257e (e.g., for detecting pivot zenith). Other sensors 257 are contemplated for including in the sensor box 255. For example, vibration sensors, moisture sensors, clocks, timers, etc. can also be included. By positioning all of the sensors 257 at a common location (e.g., within a common housing or box 255), all of the sensors 257 and/or other related data collection devices can be mounted at the same time. Also by positioning the sensor box 255 at or near the solar panel array 206 or, alternatively, near the actuator 250, the sensors 257 that detect position, velocity, etc. are appropriately positioned to measure the rotating and pivoting motion of the tracker assembly 203. Similar to the sensor box 255, the tracker electronics 205 can be located within a common housing or box 258 (e.g., a secure (lockable), weather proof box) that can be mounted at or near the tracker assembly 203.

Figure 2E:
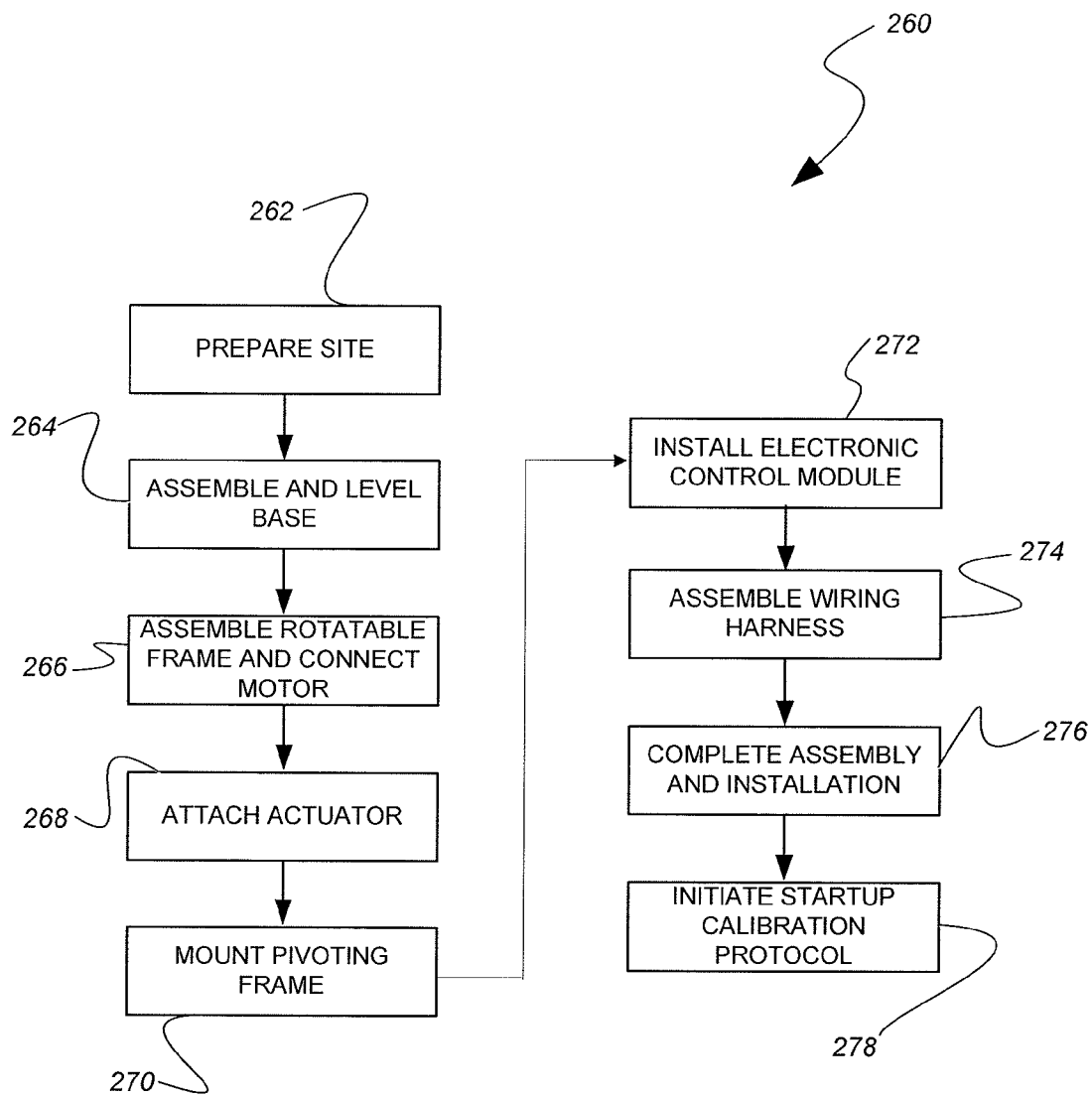
FIG. 2E illustrates a method of assembling the tracker assembly configured in accordance with an embodiment of the present technology.

Other aspects of the present technology are directed to methods of assembling the tracker assembly 203. In general, methods in accordance with an embodiment of the present technology are suited for quick assembly. FIG. 2E illustrates a method 260 of assembling the tracker assembly 203 in accordance with an embodiment of the present technology. The method 260 of assembling a tracker assembly 203 includes preparing a deployment site by digging footing holes in the ground, or in other embodiments (e.g., roof top assembly applications), preparing support structures to couple foot plates 214 thereto (block 262). In some embodiments, the deployment site does not need to be level. The method 260 can also include assembling and leveling the base 210 at the deployment site (block 264). Assembly of the base 210 can include, for example, assembling the track member 212. In one embodiment, the track member 212 may be provided as 4 arcuate pieces that can be coupled to form a circular track member 212. Assembly of the base 210 can also include attaching a plurality of foot plates 214 to the track member 212 and, in some embodiments, further securing the foot plates to the track member with support members 216. Assembly of the base 210 may further include providing the base member 217 and attaching the plurality of radially extending arms 218 to the base member in a manner where the arms engage the track member with wheels 219. Once assembled, the base 210 can be secured to the deployment site via attachment of the foot plates 214 via poured concrete or mechanical coupling (e.g., bolts, screws, pins, etc.) and leveled. For example, the foot plates 214 can be set in the holes in the ground or attached via other retaining structures (bolts, screws, brackets, etc.) in a manner that levels the base 210 regardless of condition of the site.

The method 260 can continue with assembling the rotatable frame 220 (e.g., assembling the towers 222, mounting the towers on the base 210 via mechanical coupling (screws, bolts, etc.), attaching the hinges 228 to the towers, etc.) and connecting the motor 240 (e.g., slew motor) to the base 210 for rotating the rotatable frame 220 (block 266). The method can further include attaching the actuator 250 to the rotatable frame 220 with the pins 251, 252 (block 268) and mounting the pivoting frame 230 to the hinges 228 of the rotatable frame (block 270). In operation, the actuator 250 (e.g., a linear actuator) is positioned such that the actuator can engage a backside of the pivoting frame 230 to move the pivoting frame around the X-Y axis created by hinge points.

If not already completed, solar panels can be attached to the pivoting frame 230 in an array. For example, solar panels can be attached and carried by the pivoting frame in a 6×6 solar panel array 206 as shown in FIG. 2A. Other solar panel array configurations are contemplated. The method 260 can also include installing a lockable and/or weatherproof electronics box 258 (e.g., for housing an electronic control module or tracker electronics 205) (block 272). The method 260 can further provide at block 274 assembling one or more wiring harnesses (e.g., having quick connect/disconnect cables) to facilitate electrical connections with the motor 240, actuator 250, sensor box 255, and solar panel array 206 as well as other components, such as an array of batteries (not shown). Further assembly and startup steps are also contemplated. For example, the method 260 could include completing assembly and installation of the tracker assembly 203 (block 276) and initializing a startup calibration protocol (block 278).

Accordingly, in contrast to conventional trackers that have to have a large center hole dug for deep post installation, installation of the tracker assembly 203 can be done with minimal equipment (e.g., a wrench, stepladder, etc) and with minimal effort (e.g., an average sized person). In one embodiment the components of the tracker assembly 203 can be sized to meet Occupational Safety and Health Act (OSHA) requirements such that a single person of average size can carry, manipulate and/or otherwise assemble the components of the tracker assembly 203. For example, the method 260 can be performed by one or two persons of average size without the use of a crane or other special equipment to assemble and deploy the tracker assembly 203. Many of the components of the tracker assembly 203 can be off-the-shelf components (e.g., slew motor, linear actuator, fabricated metal components) and could be relatively lightweight to facilitate ease of assembly at a desired site.

The tracker 200, the tracker assembly 203 and/or portions thereof may be assembled and distributed as kits. The kits can include tracker and/or tracker assembly components and instructions for assembling, installing, and/or initiating use of the tracker assembly 203. For example, the kit may include all metal or other fabricated components for building and assembling the base 210, the rotatable frame 220, and pivoting frame 230 (e.g., frame structures, bolts and other coupling devices, motors, electronic components, wiring harness, sensor box, etc.). As described above, the components can be sized and of suitable materials to meet OSHA requirements so that an individual person of average size can use the kit to assemble the tracker assembly. Additionally, the kit can include assembly instructions (written instructions, video explanations, computer simulations, etc), such as, for example, instructions on how to perform the method 260 described above. The kit may also include other instructions, for example, instructions on operation, maintenance and/or repair of the tracker 200 and/or tracker assembly 203. In some instances, the kit may also include one or more solar panels to mount in the pivoting frame 230.

Figure 3A:
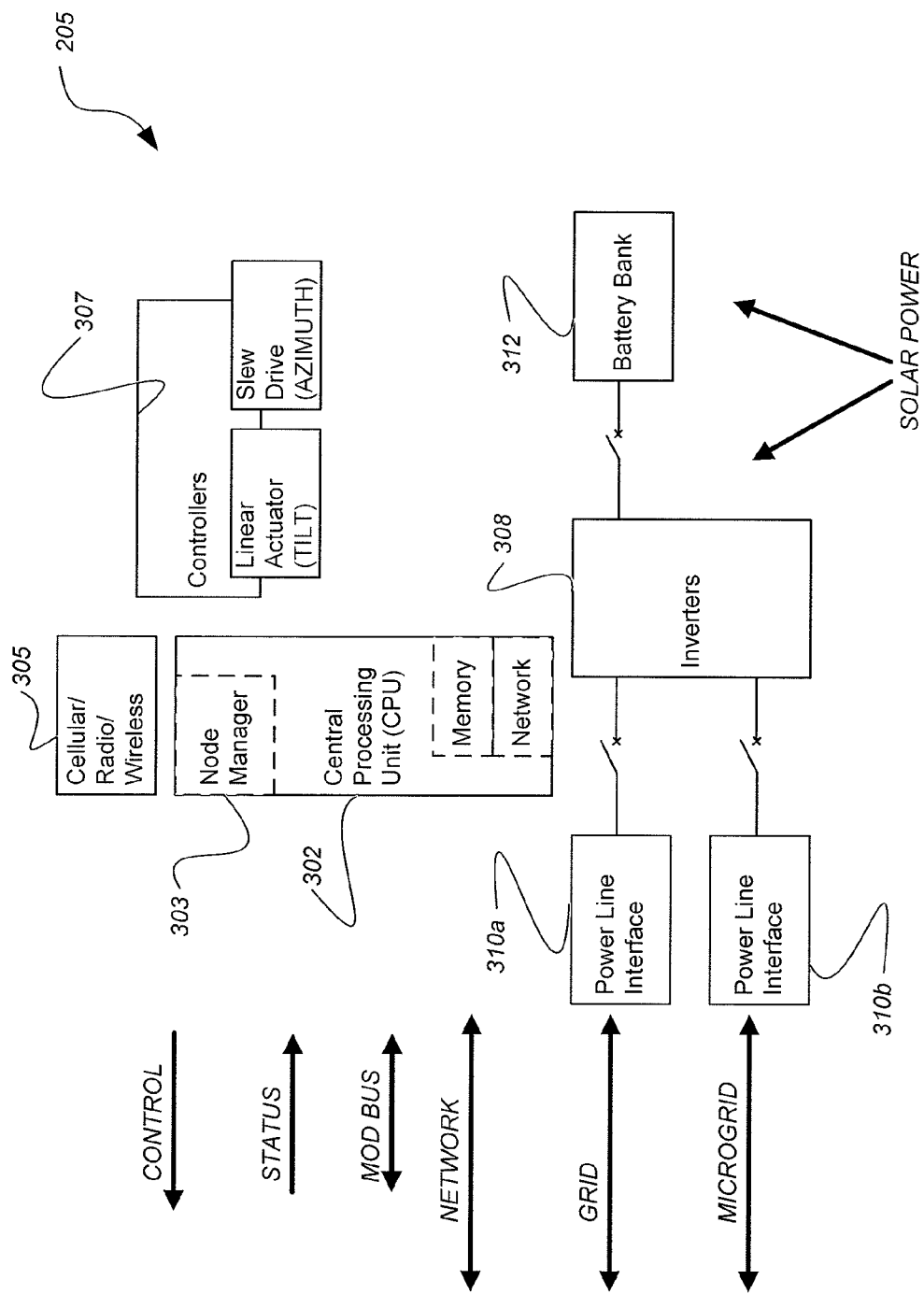
FIG. 3A is a block diagram illustrating tracker electronics configured in accordance with an embodiment of the present technology.

FIG. 3A is a block diagram of the tracker electronics 205. In the illustrated embodiment the tracker electronics 205 include a CPU 302 (central processing unit) including at least one programmed processor configured with memory to operate as a node manager 303. The CPU 302 can also include interfaces and other components for communication over a network and/or with other devices (e.g., via a Mod Bus). The tracker electronics 205 further include a wireless communication component 305, controllers 307, and inverter circuits 308. The wireless communication component 305 can be configured to provide a direct wireless link for the CPU in addition to or in lieu of standard networking capabilities. The controllers 307 are configured to communicate control signals to the tracker assembly 203 to control the motor 240 and the actuator 250. The Inverters 308 are configured to receive solar generated electricity and convert the energy into AC form. The inverters 308 can supply the DC voltage to first and/or second power line interfaces 310a, 310b. The inverters 308 can also convert stored energy at a battery bank 312 into AC form. In some embodiments, the inverters can convert AC power from the grid or microgrid into DC form suitable for charging the batteries at the battery bank 312 and/or for powering at least a portion of the tracker electronics 205. In some embodiments, the tracker electronics 205 can be powered by the solar energy collected by the solar panel array 206. In still other embodiments the battery bank 312 can be configured to provide power to the grid or the microgrid.

In operation, the tracker electronics 205 are configured to control the tracker assembly 203 and to receive status from the tracker assembly. In one embodiment, a user can directly control aspects of the tracker 200. For example, the user can directly connect with the CPU 302 (e.g., via a USB link, wireless link, and/or radio link) to, e.g., control the motor 240 and the actuator 250 and/or to receive status from the individual sensors at the sensor box.

In other embodiments, the node manager 303 can be incorporated into the CPU 302 to provide control signals and/or receive status signals. In one aspect of operation, the node manager 303 passively collects information but does not act on the information. That is, the node manager 303 does not operate (i.e., control) the nodal equipment. In another mode of operation, the node manager 303 can at least partially operate the nodal equipment.

Figure 3B:
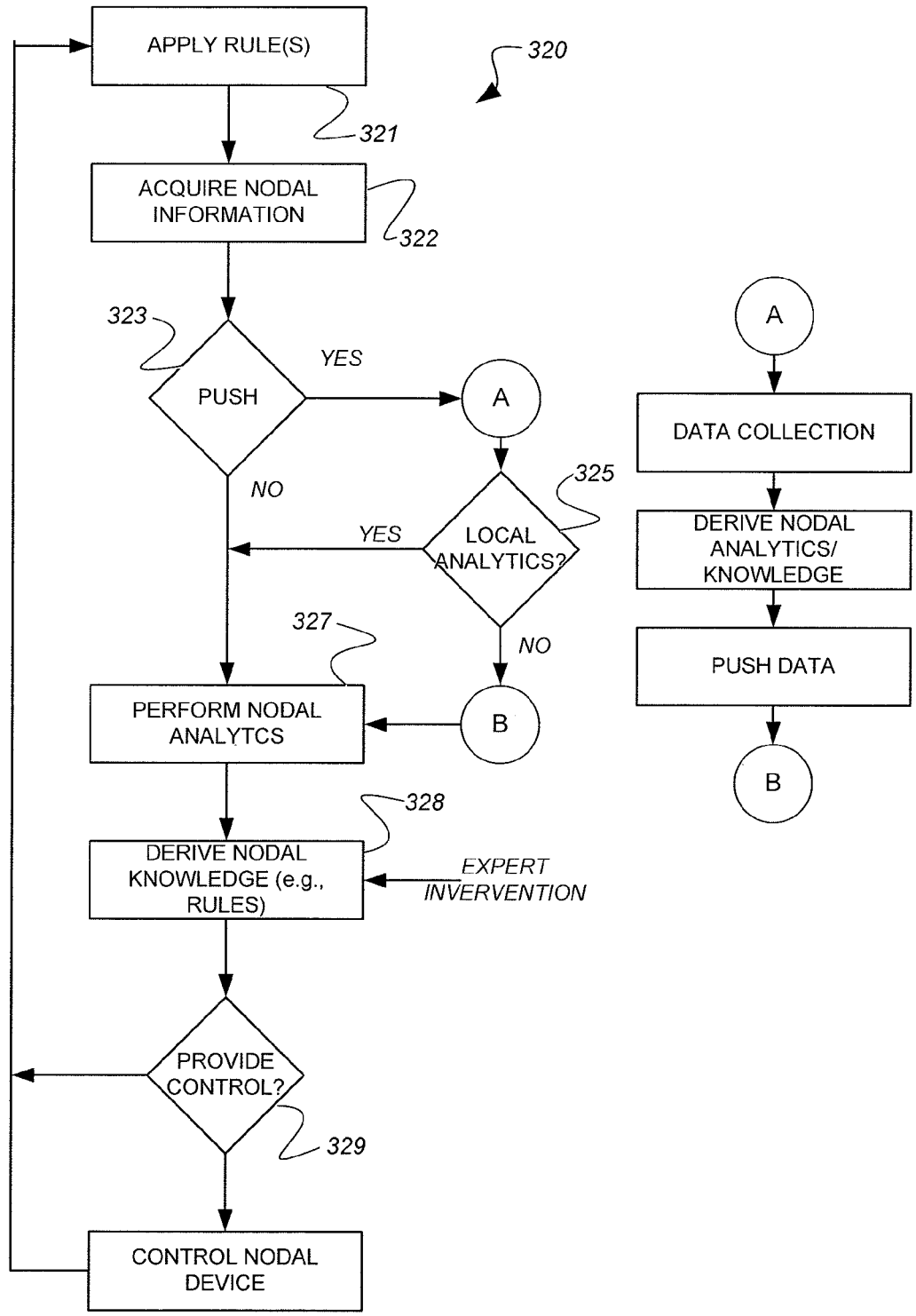
FIG. 3B is a flow diagram illustrating a routine performed by a node manager in accordance with an embodiment of the present technology.

FIG. 3B is a flow diagram illustrating a routine 320 performed by the node manager 303. In the illustrated embodiment, the routine 320 is performed by a node manager 303 at the CPU 302 of the tracker electronics 205. In other embodiments, however, the node manager 303 can be incorporated at other portions of the tracker electronics 205, such as at a logic controller. Further, in other embodiments, the routine 320 can be executed at other types of nodal equipment, including other types of energy equipment (auxiliary).

At block 321, the routine 320 applies one or more rules that dictate, at least in part, the operation of the node manager 303. As described in greater detail below, these rules can be based on nodal knowledge. In some embodiments, the rules can give the node manager 303 certain control over the tracker electronics 205. For example, the node manager 303 can be given at least partial control over the motor 240 (to orient azimuth) and/or the actuator 250 (to orient zenith). In one embodiment, the rule would dictate that the node manager 303 automatically decrease the span range of the pivoting frame in certain wind conditions.

In another embodiment, a first rule may dictate that the node manager 303 disconnect from the main grid when power generation at the grid is unstable (e.g., spikes) beyond a certain threshold of power stability. As described in greater detail below, the first rule may be based on a series of test rules and nodal analytics that arrived at this particular threshold. In some embodiments, a second rule may work in combination with the first rule to dictate when the tracker 200 should connect to the microgrid. For example, the second rule could dictate to the node manager 303 to connect the battery bank 312 to the microgrid when the battery is holding a sufficient amount of charge, or to keep the battery bank disconnected until the battery bank has the appropriate amount of charge. The rule could be based on nodal knowledge (i.e., nodal knowledge 18, FIG. 1)) related to a weather model in response to a rule related to a predicted weather plan.

In some embodiments, the rules can be "birth certificate" rules that set the initial operating behavior of the node manager 303. In one embodiment, a birth certificate can be loaded when the tracker 200 is being assembled. When the tracker 200 is operational, the birth certificate can dictate that the node manager 303 self-calibrate the tracker assembly 203. By contrast, conventional tracker-type devices can be difficult to set up in the field because they can require complicated and time-intensive calibration procedures. For example, installers need to manually align these devices for compass heading and manually level the devices with, e.g., the ground.

However, the birth certificate can provide rules that instruct the tracker 200 to find proper compass direction using a GPS sensor. In another embodiment, the birth certificate can provide a rule that the node manager uses to auto-level the tracker assembly. A tracker can be off level if the foot plates are improperly installed or if the ground shifts. The birth certificate rule can provide tuning adjustments that compensate for any out of level alignment of the foot plates. In particular, the birth certificate rule can instruct the motor 240 or the actuator 250 to operate in a way that compensates for out of level alignment. In another embodiment, the sensors 257 from the sensor box 255 can be used, for example, to detect the position of the sun, GPS location, etc., which could also be useful for initial calibration.

At block 322, the routine acquires nodal information 14 (FIG. 1) by sensing, detecting, requesting, or otherwise acquiring nodal information. For example, the routine 320 can sense ambient conditions, request information over a network, or be pushed information without a request. The nodal information 14 can relate to, for example, ambient conditions (e.g., barometric pressure, humidity, sunlight, wind speed, temperature, etc.), operating conditions (e.g., operational status of sensors, motors, grid signal quality, battery capacity etc.), and/or performance (e.g., array output power, conversion efficiency, etc.). The routine 320 can acquire nodal information 14 using, for example, the sensor box 255, network communications, and/or the wireless or radio network 305 (FIG. 3A).

In many embodiments, the routine 320 can time/date stamp and GPS stamp the nodal information 14. In this way the tracker 200 or a remote device can use the nodal information 14 to derive spatial temporal analytics information. As described in greater detail below with reference to FIGS. 4A-4D, the nodal information 14 can be utilized in a variety of network configurations, such as cloud networks, local networks, network islanding, etc.

At decision block 323, the routine 320 determines whether to push (e.g., transmit) some or all of the nodal information 14 to at least one other nodal device (e.g., nodal equipment 12, FIG. 1), such as a remote server, a local computer, a maintenance technicians' portable computing device, etc. In some embodiments, the other nodal devices can use the nodal information 14 to develop analytics that are fed back to the routine 320 (see adjacent flow routine A to B). In one embodiment, the other nodal devices can use the nodal information 14 to derive nodal analytics/knowledge 16, 18. In another embodiment, the nodal analytics 16 and/or nodal knowledge 18 could be used by a tracker manufacturer to develop birth certificates (see above) for new tracker installations. In this way, newer trackers 200 could be as "smart" as existing trackers 200 (i.e., by passing on the same knowledge to new trackers). For example, a "new" tracker 200 could learn from an "old" tracker that operating at certain motor speeds for a given amount of temperature, humidity, etc., could cause malfunction.

At decision block 325, and if the routine 320 determines that data is to be pushed (block 323), the routine 320 further determines if it should apply at least a portion of the nodal analytics 16. In some embodiments, the routine 320 can delegate more computationally intensive tasks to another nodal device (e.g., to perform processor intensive correlations), but still perform less computationally intensive tasks (e.g., data comparison). In other embodiments, the routine 320 can have all analytics delegated to another node manager 303.

At block 327 the routine 320 processes nodal information 14 according to various nodal analytics 16. An example of such correlations is described below with reference to FIG. 3C.

At block 328 the routine 320 develops nodal knowledge 18 based at least in part on the nodal analytics 16 applied at block 327. In particular, the routine 320 can decide in a rule making stage whether a particular rule should be tested (or further tested) before it is adopted, whether the rule should be discarded, or whether the rule should be deemed true (e.g., an expert opinion rule that is deemed to be fact or that is based on manual intervention from a user). In one embodiment, certain nodal information 14 can cause nodal analytics 16 to substantially change a rule.

At decision block 329 the routine 320 determines whether it should grant nodal control to the nodal device. In some embodiments the nodal device is passive. For example, the nodal device can be suited to gathering data but not controlling the position of the tracker 200. In another embodiment, the nodal device could be a consumer device used to gather data for analyzing a user power consumption behavior. For example, a transaction could include incentives for users to provide information relating to their consumption behavior. A discounted price for such a unit could be offered in exchange for this information. This information could be useful for creating nodal knowledge 18, such as consumer power consumption. Table 1 provides various other examples of nodal information 14.

TABLE 1

| Local Nodal Information | Generic Nodal Information |
| --- | --- |
| Wind speed | SCADA (e.g., data from grid) |
| Wind direction | Grid Voltage |
| Ambient temperature | Grid power factor |

TABLE 1-continued

| Local Nodal Information | Generic Nodal Information |
| --- | --- |
| Barometric pressure | Grid configuration |
| Ambient/Planar irradiance (sun ambient) | Battery charge levels |
| | Available discharge power |
| Solar cell temperatures | Signal conditioning |
| Motor currents | User demand |
| Motor temperatures | Demand response |
| Tilt/Azimuth | User consumption |
| Real time (time stamp) | Consumer pricing |
| GPS location | |

A fundamental problem with incorporating solar energy into existing electrical grids is that the grids must have enough capacity to meet peak demands when aggregate demands are highest. A conventional solution is "pure peaker" power plants. Conventional solar generation is typically not suitable as a pure peaker because even though its availability is predicable, it cannot be guaranteed. Solar generation has low inertia; generation can be online/offline almost instantaneously. Conversely traditional power plants (coal, nuclear) require days to cycle. Load following gas plants require 30 to 90 minutes. The demand for ancillary services, which is typically over multiple intervals on any given day, occurs when power must be added to or taken off grid in a matter of seconds to regulate voltage or power factor corrections.

For these and other reasons the inclusion of conventional solar systems at significant levels introduces problems that will increase with additional solar deployment (PV penetration). Due to both the intermittent and low inertia of conventional solar generation, significant disruption to the generation hierarchy of base load and "pure peaker" plants results in significant price volatility. Additionally, utilities must keep electricity in reserve to provide for supply disruptions or demand spikes, and they must regulate voltage and keep it steady. Both imperatives are difficult when solar resources come online/offline abruptly.

Figure 4A:
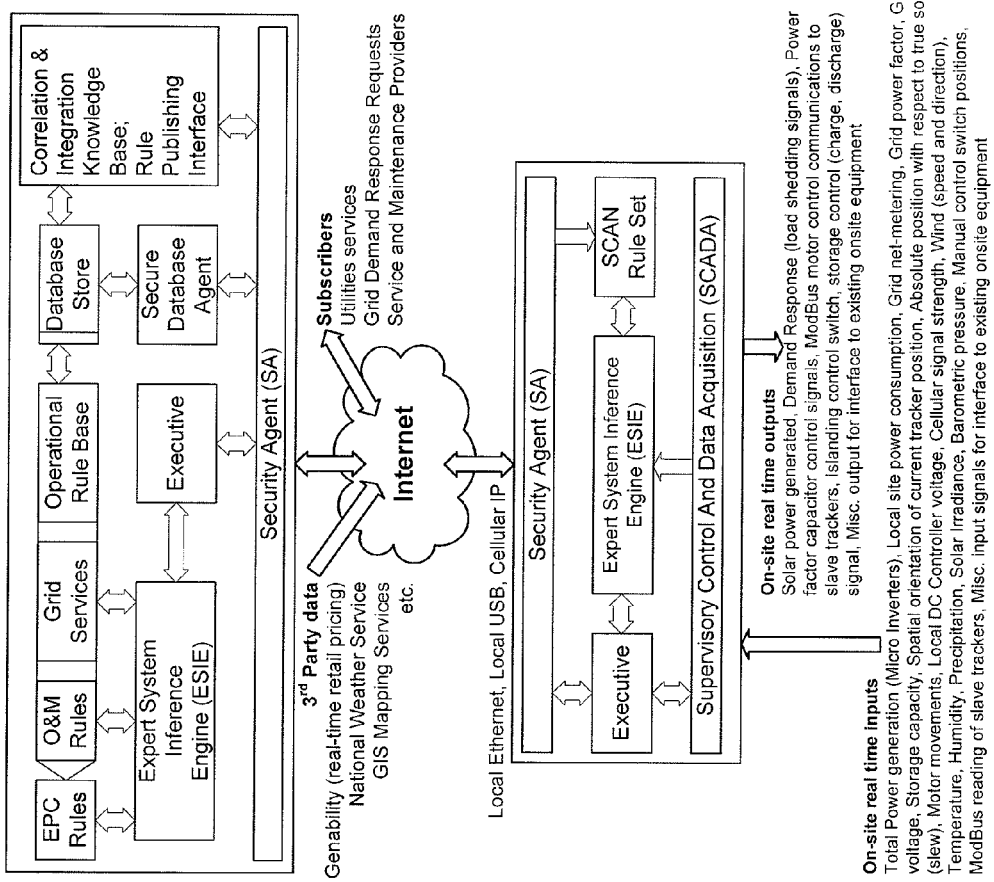
FIG. 4A is a diagram of an energy network configured in accordance with an embodiment of the present technology.

Referring to FIG. 4A, embodiments of energy distribution systems, or autonomous energy networks (AENs) configured in accordance with embodiments of the present technology can provide a complete solution from deployment to management of a fully autonomous distributed power plant. The successful realization of an efficient and reliable solar energy source can include:

Targeting "nonproductive," sun-advantaged land close to power lines for the location of equipment. The ideal property is suburban/urban brown lots that are on the local substation feed to where the power will be used. Although, with the use of virtual net metering, these geographic limitations are bypassed allowing the generation site and energy consumption to spread across the utility service area. A low-profile, small footprint installation facilitates use of marginal nonproductive land and flat roofs.

Solar trackers can enable any solar installation to harvest high concentrations of solar flux anywhere on the globe. This can realize, for example, up to a 50% increase over fixed angle installations for the same solar panels. This increased production for the same number of solar panels saves on land, labor, and components costs. Matching production with local consumption and grid conditions is possible with the addition of multiple solar trackers. For any solar panel, maximum energy harvest is guaranteed throughout the year.

The tracker electronics 205 can employ a Smart Controller and Analysis Node (SCAN) that includes an Expert Systems Inference Engine (ESIE) embedded into each installation to provide dynamic, rules-based decision response to real-time events on the grid and at the local installation. Decisions whether to store, consume power onsite, or net meter are events that need to take in a myriad of changing conditions.

These rules can be generated in the AEN data center to take advantage of an aggregation of many installations and events that are happening on the grid (DNR, supply interruptions, real time pricing, etc.) and then transferred to the local installation.

To take advantage of high efficiency solar trackers and provide reliable generation sources, there can be guaranteed minimum down times and the ability to proactively operate and maintain (O & M) a large number of installations remotely with a minimum of service truck rolls. Each local SCAN installation combined with the AEN can provide installation flexibly with the added sophistication of remote analytics and management. The AEN platform can provide an active intelligent "Expert System" presence at the edge of the grid through, e.g., an integrated cellular communications network.

Each installation can include a computer, such as a Linux based computer, with SCADA (Supervisory Control And Data Acquisition) capabilities and an Expert Systems Inference Engine (ESIE). This decision expertise manages the local installation and provides remote access through, e.g., a cellular network connection. The AEN's SCADA API (Application Program Interface) allows QES, partners, and utilities access to local grid operational data and a platform for advanced smart grid applications. The ESIE enhanced supervisory capabilities manage the advanced power harvesting (Learned Energy Ray Normalization, LERN) algorithms for sun positioning for up to 20 solar trackers. Data is gathered, analyzed, and reported to the AEN network for near real-time and historical tracking. The ESIE management proactively monitors trending and exception events that are processed at the local site and reported to the AEN. Modified ESIE rules are downloaded when new "insight" is generated from the AEN master ESIE processing aggregate data sets of a large number of installations plus third party data bases (real time market pricing, DRM requests, national weather services, solar forecasts, etc.). Various related functions can include:

Solar PV panels and micro-inverters provide power and data (inverters; continuous power output and grid voltages). This data is cached, analyzed, and compressed for upload to the AEN storage for analysis providing predictive maintenance, warranty, and billing functions.

Voltage control at the point of power consumption. This function can monitor the voltage and power factor of the grid voltage. Problems can be rectified, for example, in one or more of the following ways:
  Low voltage
    Add capacitance to correct the power phase of the grid voltage. This action corrects under voltage conditions where there is distortion of grid power factor from large reactive loads (motors, A/C units, etc.).
    Discharge storage device.
  High voltage
    Slightly turning gantry away from sun to reduce generation.

Diverting generation into charging of storage devices.

Sensor inputs from the physical actions of the solar tracker and the local environment can include:

Weather station (wind speed, wind direction, temperature, humidity, solar irradiance, precipitation, barometer, reference solar irradiance).

Spatial orientation sensors of the real world position of the gantry as opposed to where it is calculated to be. This sensor can also be used to detect unauthorized gantry manipulation or attempted theft.

Absolute reference sensing of true south compass direction.

Additional I/O for controlling local hardware, measuring local variables, and discrete inputs.

SCADA functions can include:

Control of each axis motor and correct operation throughout the controlled sun tracking moves.

Measurement of grid voltage.

Measurement of grid power factor.

Monitor of local controller supply voltage (voltages delivered to each motor).

Status of local network (Modbus, Ethernet, USB, Cellular radio).

Monitor and control override switches for local maintenance operations.

iOS (iPhone, iPad, etc.) control surface for local control of installation.

Calculation of the position of the sun.

Validate correct movement of the gantry, monitor long term mechanical drifts of motors and gantry movements, and apply correction.

Logging of power generation and performance metrics, compress, analyze, and transmit to AEN remote secure server.

Update software modules through secure network connection.

Provide real-time secure access for troubleshooting.

Provide local sun intensity information for cloud prediction services

Interface to existing utility or installed generation and control equipment.

Provide micro climate information, such as current solar insolation value, temperature, barometric pressure, wind speed, wind direction, and/or precipitation.

ESIE functions can include:

Update local ESIE current rule sets.

Calculate long term drifts on power generation and apply corrections (LERN).

Provide voltage control action decisions.

DMR action decisions.

Manage intelligent power storage and dispatch with various storage and generation options, such as batteries, fuel cells, and/or compressed Air.

Provide intelligent islanding logic, such as automated islanding reconnection from grid when unstable grid conditions exist, demand response requests from utility to take site offline on low voltage (brown out) conditions, intermittent, or blackout conditions, and/or provide power to on-site customers during local blackouts.

Real time load measurement and management of customer electricity consumption for energy use profile optimization. This function can be augmented by use of a local appliance control network such as ZigBee for granular onsite energy management.

Secure site with motion (gantry) and video surveillance.

Figure 4B:
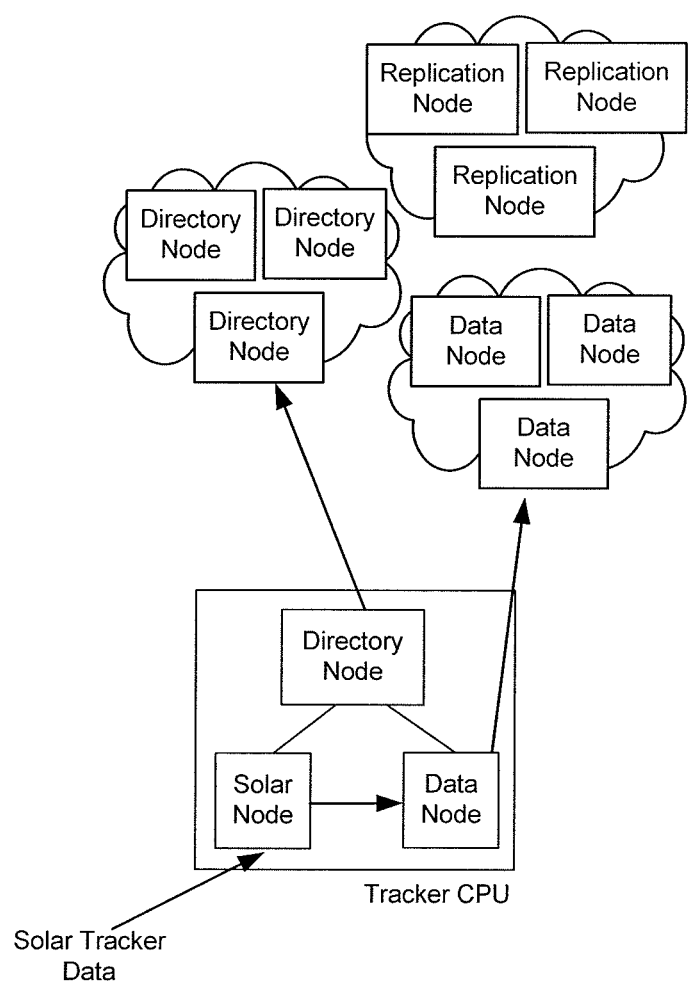
FIG. 4B is a network diagram illustrating a cloud-based networked arrangement of node managers configured in accordance with an embodiment of the present technology.

In various embodiments, the AEN can include cloud based data and control network connects to each SCAN installation allowing the aggregation of information and services to be near real time, historical, proactive, and predictive. Each SCAN computer has the intelligence to perform the tasks demanded for complete autonomous operation if it never connects to the AEN cloud. This can allows for intermittent operations as standalone entities to optimize various network configurations and real world limitations of network performance. Referring to FIG. 4B, in the cloud, there can include a few replication nodes, a number of directory nodes, and a larger number of data nodes. In one implementation, one might run all of these nodes on virtual machines in, e.g., Amazon data centers. Directory nodes can manage information and topology about all other nodes and help nodes find one another. Data nodes store data, and replication nodes manage pulling data from less-accessible or slower data nodes (e.g. tracker nodes) and push data to bigger machines with more reliable network connectivity.

In normal operation, a solar node collects data and then locates the local data node by consulting the directory node. The directory node also knows about other directory nodes in the cloud, and can consult them to find data nodes running in the cloud to push data to as well. Most of the intelligence about where data should go is handled by the replication nodes in the cloud; the solar node mostly pushes data to whichever is the closest data node according to the directory node.

In disconnected mode, the solar nodes function as before. However, the directory nodes cannot find the authoritative directory nodes, so they coordinate among themselves and elect a gantry to start a local replication node. This node manages local storage space for the island by prioritizing data so that the remaining storage is balanced between data nodes, and, in the event one needs to discard data, the lowest-priority data is discarded first. Once the network is functioning again, the replicator node coordinates reconnection to the rest of the network, and the queued-up data drains out to the data nodes in the cloud.

Note that there may be situations where some trackers 200 in a group may be in a state of permanent disconnection while others in the same group have normal network access. In this case, the local replication node hangs around to replicate data from the partially-disconnected data nodes out to more available data nodes.

The AEN can also provide other features, such as:

Aggregation and storage of information from all subscribing installations.

Provide API interface to data set for both in-house use and subscribers:

Micro environment weather data over a large geographic area, providing near real-time and historical information.

Near real-time and historical local grid conditions.
Voltage
Power factor
Outage information Near real-time power and historical power generation from any subscribing SCAN installation.

Near real-time and historical power usage of local site consumption and energy use profiling.

Individual SCAN and aggregate solar generation forecasting.

DRM service requests.

Voltage regulation services.

Power factor correction services.

Operations & Management of SCAN installations.
SCAN ESIE rule sets generation and updating.
SCAN program updating.
Analyze long term drifts on power output of each PV panel.
Expert systems scheduling of service and maintenance.
Warranty monitoring for performance guarantees.
Power generation metrics for billing of PPA installations.
Large account corporate management of multiple sites
Utility planning and provisioning In some embodiments, the knowledge base on the network cloud handles logistics, the installation process, the sales process, and even the permitting process to ensure that there is maximum efficiency, reliability, and minimum cost from sales lead generation to maintenance schedules. This is all exposed to employees and dealers through a graphic interface (see below) that runs on a computer, laptop, tablet or smartphone. Each employee has a certain level of security clearance that allows them to see or not to see certain information on their particular account.

The SCAN installation can be a complete turnkey solution that provides the site customer an efficient and reliable power source that is remotely managed and is maintained as an evolving intelligent smart grid power generation asset. The customer need not have any expertise in power production equipment, networking, or operations and maintenance. All functions are managed by onsite intelligence supported by integrated, offsite management.

Smart grid capability built into both the onsite SCAN and remote AEN offer the utility the ability to see what is happening at the customer end of the grid network. These features alleviate the problems of blind solar deployments (residential rooftops) that offer no visibility to the grid operator. With the addition of a SCADA API, integration to the utility management software platforms is enabled. This offers real value to the utility by providing and integrated and reliable power source where power is consumed. By solving the PV issues articulated above, the PV penetration problem is minimized allowing solar energy to be an asset rather than a problem to the grid.

Figure 4C:
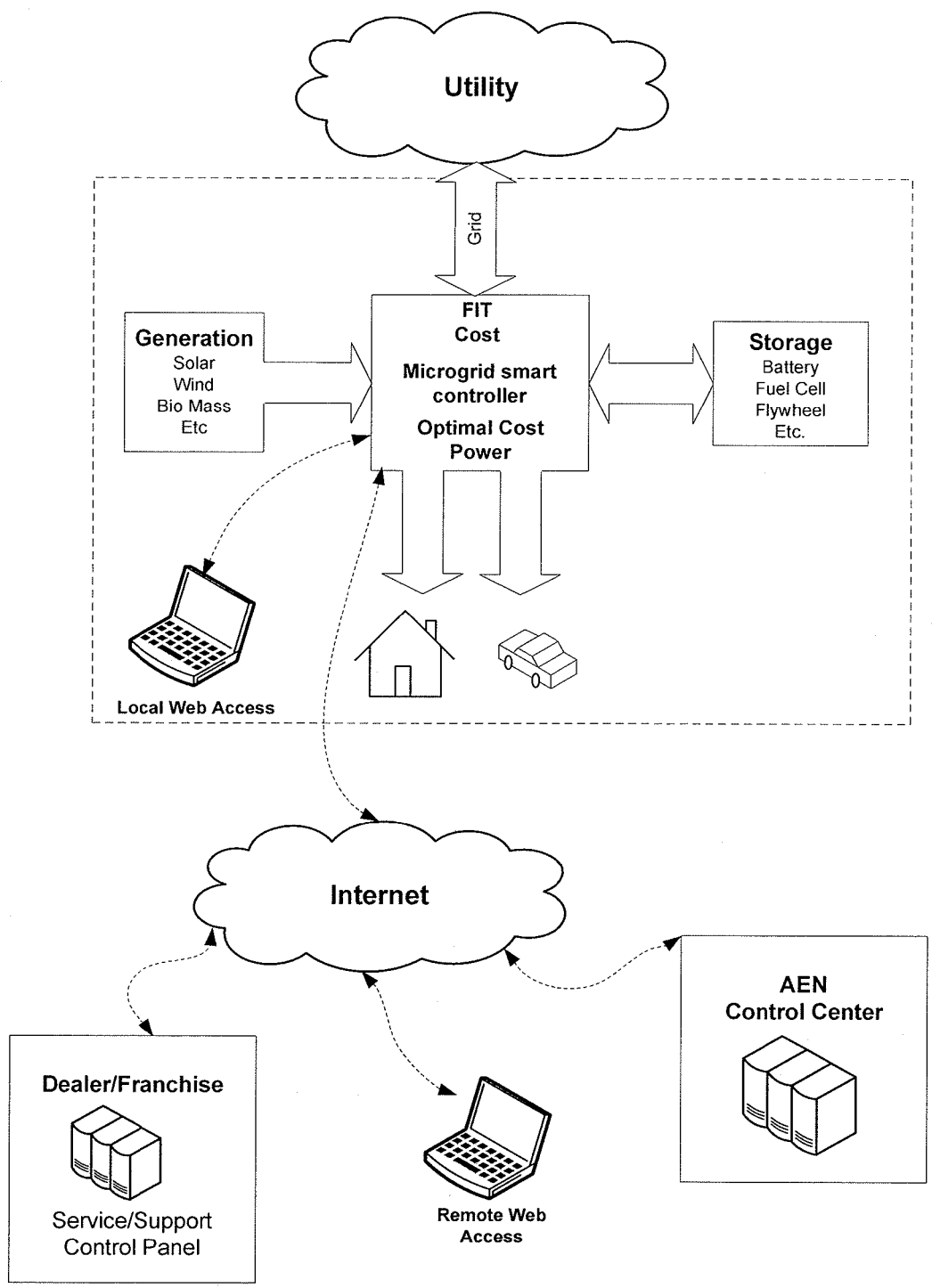
FIG. 4C is an diagram of a controller center arranged to operate various aspects of a microgrid in accordance with an embodiment of the present technology.
Figure 4D:
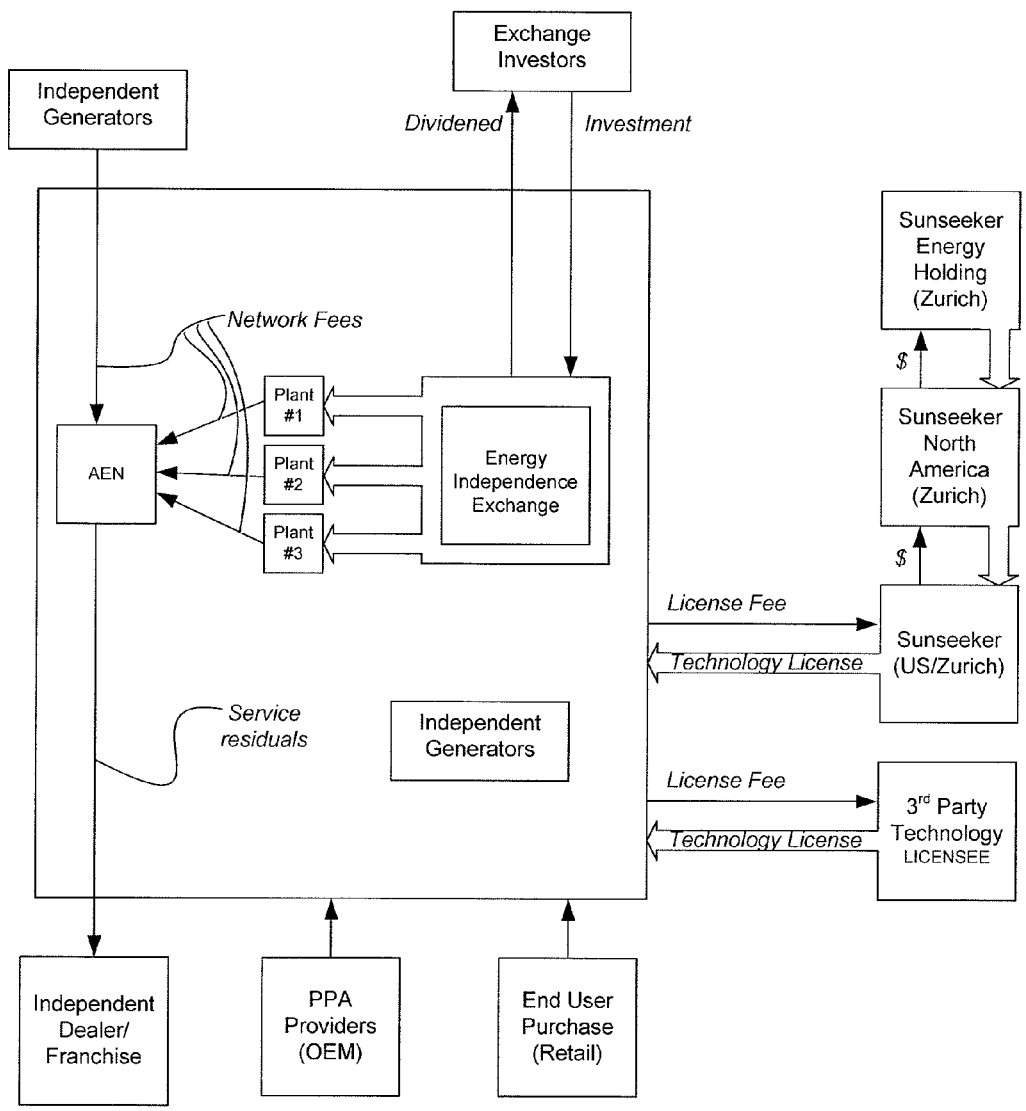
FIG. 4D is a diagram of a microgrid licensing/investing/purchasing scheme configured in accordance with an embodiment of the present technology.
Figure 5A:
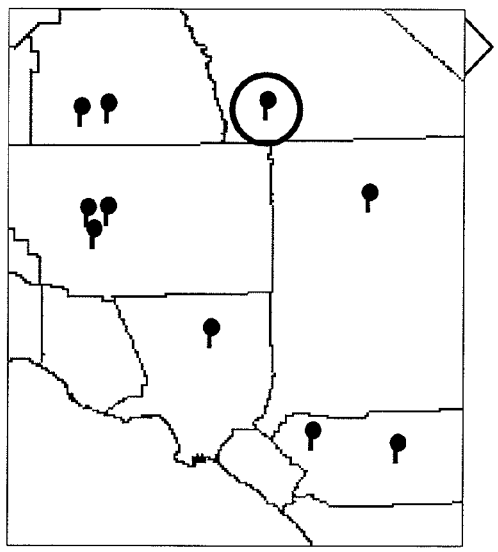
FIGS. 5A-E illustrate various example user interfaces that can be used with a node manager in accordance with an embodiment of the present technology.
Figure 5B:
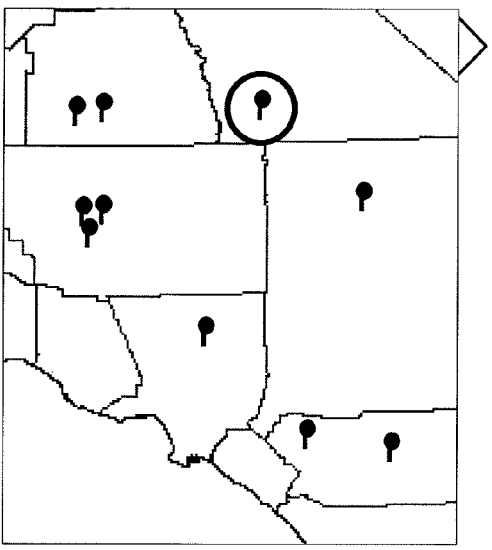
Figure 5C:
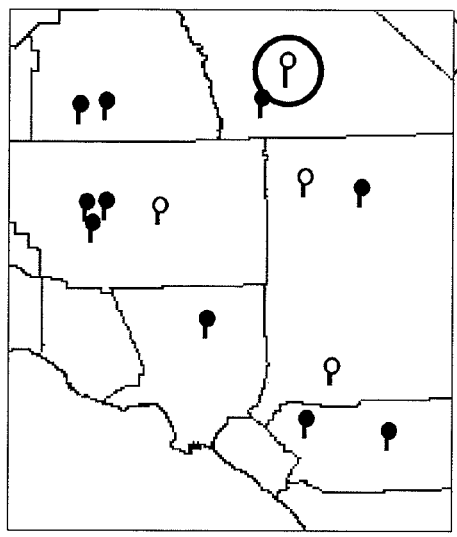
Figure 5D:
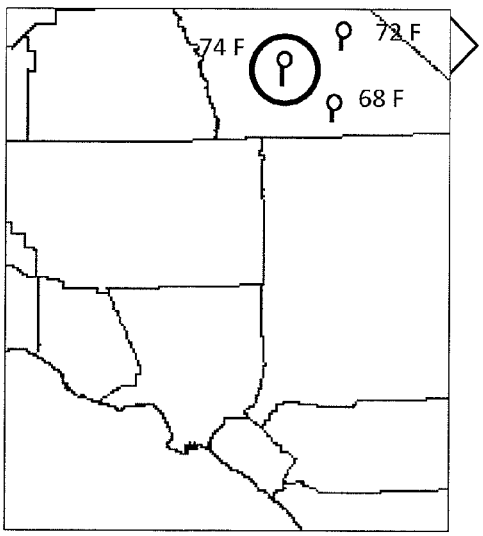
Figure 5E:
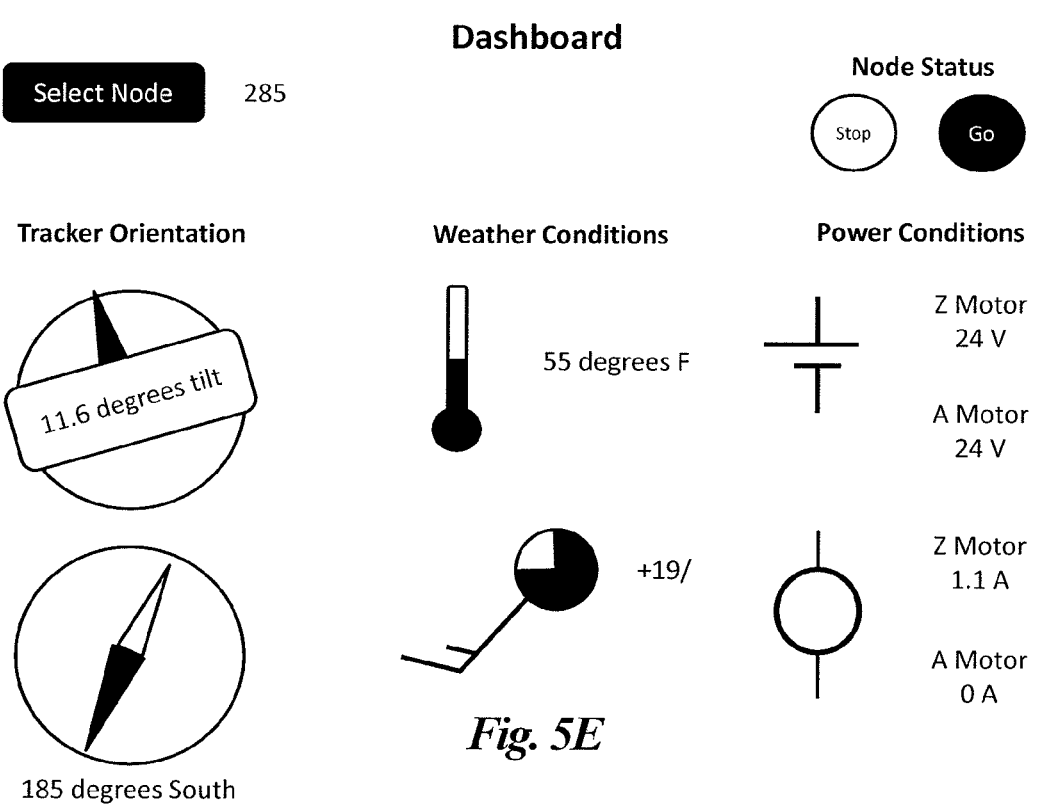

Referring to FIG. 4C, an AEN controller center can be arranged to operate various aspects of a microgrid. Referring to FIG. 4D, a microgrid licensing/investing/purchasing scheme can include technology licensees, exchange investors, independent generators, independent dealers/franchisers, power purchase agreement providers (PPA), and a microGrid Energy Independence Exchange. As shown in this scheme, various network fees, service residuals, licensing fees, investments, and dividends can be generated.

Figure 3C:
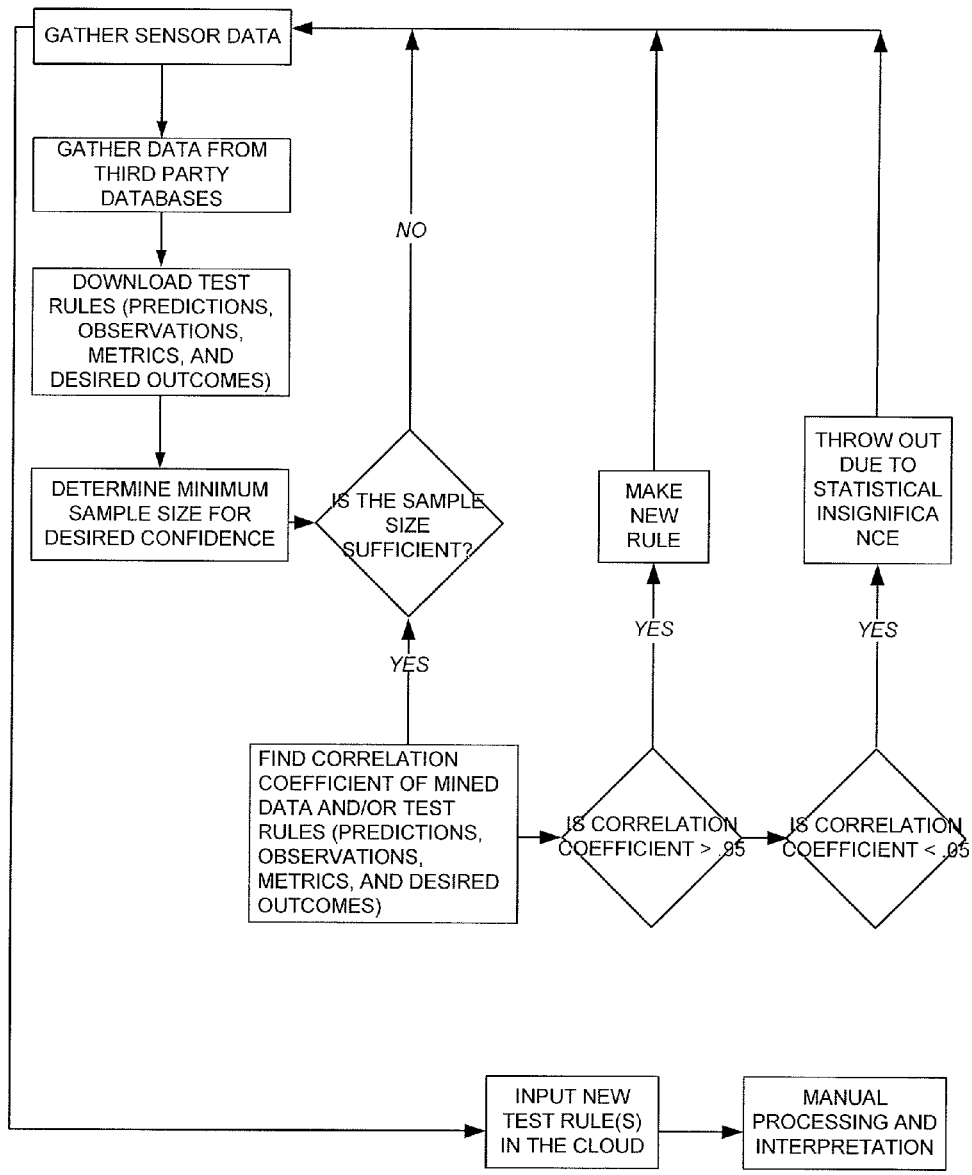
FIG. 3C is a flow diagram illustrating a routine of a learning process employed by a node manager in accordance with an embodiment of the present technology.

Referring to FIG. 3C, the following disclosure describes certain aspects of the learning process employed by node managers (e.g., via node nodal analytics and knowledge). In one embodiment, node managers can gather sensor data from onsite sensors with time stamps and serial numbers. Node managers can further gather third-party data based on the locations and time stamps of the sensor data. Some examples of possible third-party data may include, but are not limited to, one or more of:
a. Utility SCADA requests
b. Weather data
c. Real time energy pricing
d. Grid Battery storage data The node manager can also determine minimum sample size for 99% confidence using:

i. $n = \left[\dfrac{Z_{a/2}\sigma}{E}\right]^2$ ii. n=sample size
iii. $Z_{a/2}$=critical value=value of standard distribution at 97.5 percentile confidence level
iv. E=margin of Error
  1. Simple approximation of margin of error at 99% confidence is:

$$E \approx \dfrac{1.29}{\sqrt{n}} = \dfrac{Z_{a/2}\sigma}{\sqrt{n}}$$

v. $\sigma$=standard deviation of x number of time stamped events $$\sigma = \dfrac{1}{n}\sum_{i=1}^{n}(x_i - \mu)^2, \text{ where } \mu = \dfrac{1}{n}\sum_{i=1}^{n}(x_i)$$

In one embodiment, if minimal sample size is met for 2 or more data points, there can be a test for correlation:
a. If the absolute value of the correlation coefficient (determined by the dot product of two value vectors or by the Pearson product-moment correlation coefficient) is greater than 0.95 then a rule may be made automatically and sent to manual processing for quality assurance (since correlation does not always mean causation).
  i. A theoretical example of this process is as follows:
    1. Sufficient sample size is met for correlation of 3 data points.
    2. Correlation coefficient of 0.96 between over voltage and irradiance levels over 980 W/m² when ambient temperature is below 84 degrees Fahrenheit.
    3. A New Rule is made for over voltage correction based on irradiance levels when temp is below 84 degrees.
    4. The software model would then test to find weather conditions that cause 84 degree temperatures and irradiance levels in excess of 980 W/m² to determine if over voltage may be forecasted.
  ii. A theoretical counter example (local rule testing) is as follows:
    1. Sufficient sample size is met for correlation of 3 data points.
    2. Correlation coefficient of 0.74 between under voltage and battery bank discharge request for 500 kW+/−50 kW on Saturday between 1 and 3 pm PST in La Jolla, Calif.
    3. A New Rule is not made.
    4. Rule is sent for manual processing.
    5. Manual processing makes a new TEST rule that states:
      a. Between 1 pm and 3 pm all units within a 20 mile radius of La Jolla, Calif. log voltage values and test against temperature range.
  iii. A second theoretical counter example (the case of statistical insignificance) is as follows:
    1. Sufficient sample size is met for correlation of 2 data points.

2. Correlation coefficient of 0.04 is determined between demand response requests from utility SCADA on Monday at 5:50 pm local time.
3. Correlation is thrown out and determined statistically insignificant.

The node manager can also employ manual intervention for low correlation coefficient (greater than 0.05, less than 0.95 correlation coefficient based on sufficient sample size):
   a. Statistically significant correlations can be manually examined to further test the correlation.
   b. Modifications in the rule set for both the network cloud and the distributed expert systems are used to reach a sufficiently high correlation coefficient.
      i. For example: If the correlation coefficient is 0.05, a manual TEST rule can be implemented to broaden the scope of correlation in order raise or lower the coefficient.
         1. If the coefficient stays the same or goes below 0.05, the correlation is discarded.
         2. If the coefficient goes up but is still below 0.95 a new TEST rule can be implemented to broaden the scope of correlation.

TEST rules are then used by the expert systems to find positive correlations, negative correlations, or statistical insignificance. The utility grid is affected by a statistically infinite number of stimuli from macro level weather patterns that cause droughts or floods to micro level human activities like sporting events. This makes manual processing important in order to zero in on new rules by expanding the scope of testing when necessary instead of trying to correlate the statistically infinite number of data points caused by grid stimuli. For example, if the grid is experiencing under voltage every weeknight between 5:00 pm and 6:00 pm with a correlation coefficient of 0.80, a TEST rule could be implemented to test this correlation vs. different temperature ranges. This is because under voltage may only occur at high or low temperatures due to air conditioning or heater use. The 65 to 80 degrees Fahrenheit temperature range may not experience under voltage, which may be causing the correlation coefficient to be 0.80. After the new TEST rule is implemented to check specific temperature ranges, the correlation coefficient of under voltage to time of day (5:00-6:00 pm) becomes 0.96. A new rule is made to charge batteries prior to 5:00 pm only when temperature ranges are lower than 65 or higher than 80 degrees Fahrenheit.

TEST rules, in some embodiments, can be predictions, observations, metrics, or desired outcomes that can be tested against events that occur. Correlations can be made between TEST rules and mined data from sensors and third-party databases. Correlation coefficients of less than 0.05 are determined statistically insignificant and can be ignored.

Rules can be made for:
   a. How to make rules,
   b. How to establish a value hierarchy of a set of rules,
   c. When to log data,
   d. What data to log,
   e. How to log, analyze, and correlate data,
   f. Taking action to solve problems on the grid, the network cloud management system, or the local sites,
   g. When to buy electricity from the grid and when to sell power back to the grid,
   h. When to charge batteries and when to discharge batteries,
   i. When to pull off the grid when things become unstable (islanding),
   j. How to respond to automated utility requests (i.e. demand response, microgrid, islanding, etc.),
   k. When to respond to anomalies (based on standard deviation), and
   l. Which predictions, observations, metrics, or desired outcomes should be cross correlated with mined data.

FIGS. 5A-5E provide various example user interfaces that can be used with a node manager. Table 2, below, shows various examples of application interfaces for access with a node manager.

TABLE 2

Tracker control:

automatic/manual mode toggle
manual positioning
device calibration
device configuration - birth certificates, re-provisioning, latitude/longitude, tracking
interval, various other things we discover to be useful, knobs for maintenance techs
device security management
Access to current/historical tracker log data:

panel orientation
motor motion statistics (movement errors, exceptional conditions, etc.)
motor amperage
computed sun position
(later) LERN information - how far the sun is from where we computed it to be, and
other data collected to refine our solar positioning model
power generation metrics and other power-related data
Access to node/network event logs (for diagnostics):

related/neighbor nodes
local software configuration (which nodes are running where, node status)
data pushed (which data, and to where)
rules available for decision-making
rules applied
startup/shutdown/sleep events
Real-time and historical smart grid data access:

aggregate grid statistics: power generation, changes throughout the day, seasons
local and aggregate grid performance statistics
"post-mortem" data on how well our tracking and rules performed compared to the "ideal model"
aggregate statistics by location, kind of installation, size of installation, or age of installation The following description describes certain aspects of Internodal Bidding. Each node provides one or more services and/or products that vary in price based on the supply and demand of those services or products. In order to set an accurate market price for transactions that can happen frequently (e.g., every millisecond), there must be an automated system.

In some embodiments, node managers can be accessed through the nodal access interface where a minimum price can be set for the services or products offered by that particular node. Throughout each day, Internodal Bidding occurs autonomously for each service or product based on the minimum acceptable value (MAV) for that service or product. For example, this could occur when a third party requests a particular service or product or when the energy network requires a certain service or product to maintain reliability.

In some instances, Internodal Bidding can be similar to the way Google allows users to set a Maximum Cost Per Click (CPC) on certain advertising. In the Google scenario, users can set parameters for many different outcomes (e.g. maximum exposure of advertisement, lower cost per click, a mixture of exposure and cost considerations, etc.) Those willing to pay the highest CPC have the best chance of winning many bids and ensuring the most exposure. Those trying to save money, run the risk of limited or no advertising exposure. Internodal Bidding can occur in a similar fashion, with the exception that nodes are set to provide a service or product for a MINIMUM acceptable value. Suppliers of nodes that are willing to accept a smaller value for their service or product will likely sell more product or service. For example, if a node has a limited supply, suppliers will likely make their money in times of peak demand. If a node has a large supply, suppliers may choose to bid very low in order to sell the most services or products.

One of ordinary skill in the art will recognize that many parameters associated with cost and demand as well as micro- and macro-transactions can apply to the concept of Internodal Bidding. In particular examples, Internodal Bidding has several parameters that can be altered or adapted to allow suppliers associated with nodes to maximize their revenue. For example, certain MAV parameters may include setting different MAVs for different times of day, setting different MAVs for different times of year, establishing different MAVs for different services or products, establishing different MAVs for different levels of storage capacity, determining different MAVs for different weather patterns, and/or establishing different MAVs during certain predictable local events (e.g. sports events, festivals, etc.).

In many embodiments, Internodal Bidding can allow for energy products and services to maintain a reliable service while keeping the cost of energy and reliability as low as possible (e.g., much like Google has done for the advertising industry). Furthermore, it also allows the largest energy plants as well as the smallest single energy producer to participate in the energy market.

Example

Node 150 contains 64 kW of solar panel capacity and 128 kWh of storage. The Node's MAV for stored kilowatt hours is 60 cents/kWh. This is a very high price per kWh considering that the local retail price of electricity is 18 cents/kWh.

The local utility sends out a "spinning reserve" peak demand request for 60 kW of capacity for the next 2 hours. Their bid price is 65 cents/kWh because the utility's only other option is to cut service at that particular substation.

In this example, Node 150 rises to the top of the bidding with its 60 cents/kWh bid. Node 150 wins the bid and supplies 120 kWh of capacity for 60 cents/kWh. Node 150 would have received 8 cents per kWh if sold during off-peak times or $9.60. Node 150 would have received 18 cents per kWh if sold at retail or $21.60

Because of Automated Internodal Bidding, Node 150 was able to receive $72.00 for just one battery charge cycle. Accordingly, Internodal Bidding allows renewable energy and storage devices to provide the same services supplied today by fossil fuel powered generators and power plants in just milliseconds rather than several minutes, hours, or even days. In particular instances of application, the larger the network of nodes becomes, the more reliable the products and services can become.

Figure 6:
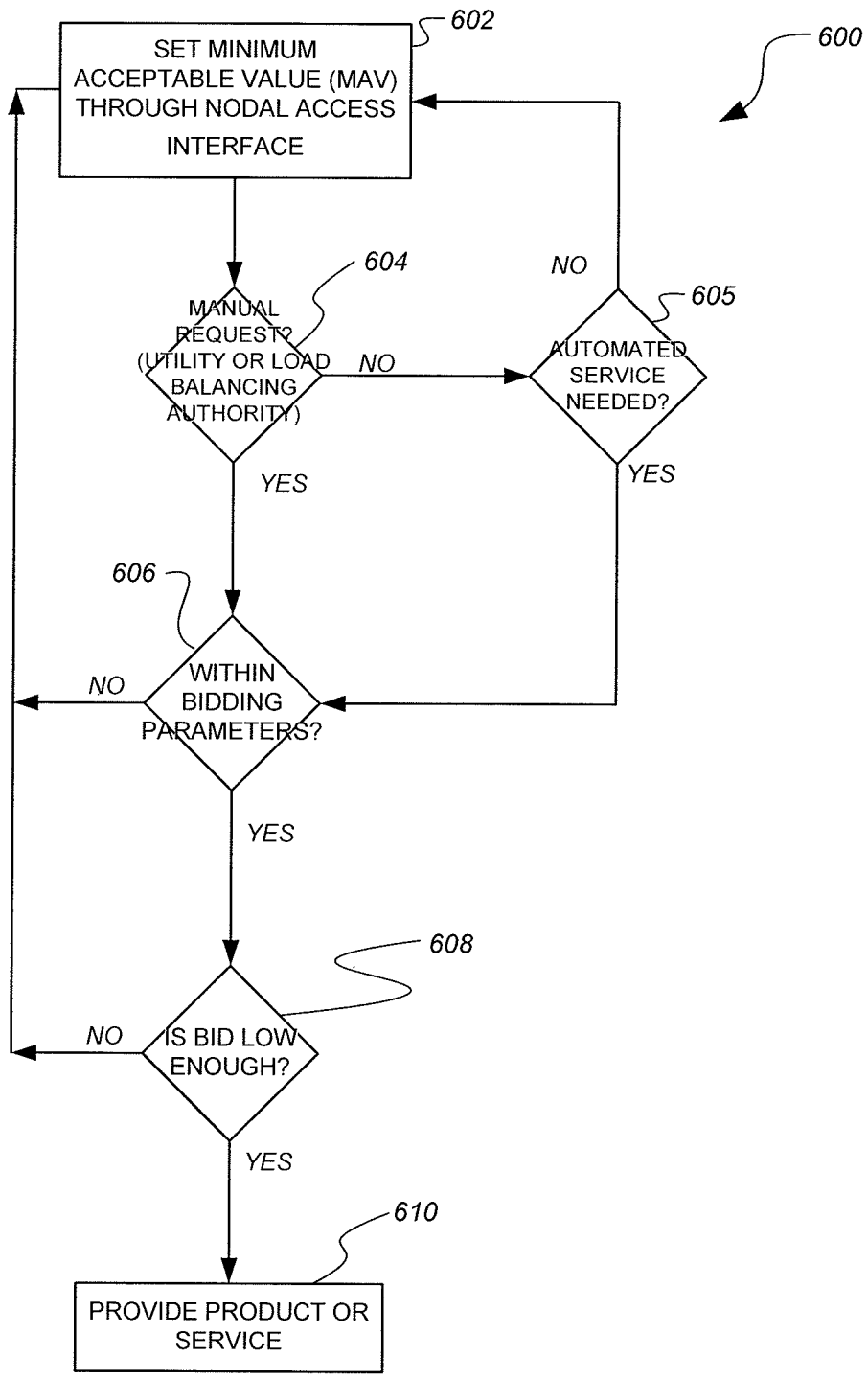
FIG. 6 is a flow diagram illustrating an internodal bidding scheme in accordance with an embodiment of the present technology.

FIG. 6 is flow diagram illustrating an Internodal Bidding scheme 600 in accordance with an embodiment of the present technology. The scheme 600 can include setting a MAV through a Nodal Access Interface (block 602). The scheme 600 can continue at decision block 604 where the scheme 600 can determine if the request is manual. If the request is manual, the scheme 600 can continue to block 606 where it is determined if the request is within bidding parameters (e.g., established parameters, pre-set parameters, etc.). If the request is not manual, the scheme 600 can determine if an automated service is necessary (decision block 605). If the automated service is necessary, the scheme 600 can then continue on to block 606 to determine if the request is within bidding parameters. If an automated service is not needed, the scheme 600 can return to block 602 where a MAV is set through the Nodal Access Interface.

If the request is within bidding parameters, the scheme 600 can continue to decision block 608 where it is determined if the bid is low enough. If the bid is low enough, the scheme 600 can provide the product or service requested (block 610). If the bid exceeds a threshold (e.g., is not low enough), the scheme 600 can return to block 602 to set a MAV through the Nodal Access Interface.

FIG. 7 show various system logs than can be generated by a node manager during a single day of operation of a solar tracker in accordance with an embodiment of the present technology. Table 3, below, shows example setup parameters corresponding to the system logs of FIG. 7.

TABLE 3

A day in the life of a distributed solar power plant deployed into the Southwest United States.

| Assumptions: | |
|---|---|
| Installed SCAN installations | 3000 |
| Gantries installed | 10,800 (average 3.6 gantries per SCAN) |
| Installed Capacity | 87.48 MWatt |
| Yearly average capacity factor | 31.25% (7.5 sun hours, yearly average) |
| Total battery storage capacity | 45,589 kWh |
| Island enabled SCAN installations | 758 |
| Voltage regulation of installed capacity | 55% |
| Demand/Response capability | 15 MW (load shedding) |
| Utility Dispatch Services | |
| SCADA Utility API | |
| Island demand requests | |
| Voltage control requests | |
| Storage discharge requests | |
| Load shedding requests | |
| Utility Data Services: | |
| SCAN SCADA Analytic API | |
| Solar forecasting data | |
| Local grid conditions data (voltage, power factor, outage) | |
| Micro climate data sets | |

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium also can be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "programmed processor" encompasses all kinds of apparatus, devices, and machines for processing data, including, by way of example, a computer, a system on a chip (or multiple ones or combinations of the foregoing). The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. For example, tracker electronics, servers, mobile devices, etc., can be implemented as a controller in an auxiliary device. The processes and logic flows can also be performed by, and the apparatus can also be implemented as, special purpose logic circuitry, e.g., an FPGA or an ASIC. For example, the node manager can be implemented as a controller in an auxiliary device.

Processors suitable for the execution of a computer program include, by way of example, both general and special purpose microprocessors, and any one or more processors of any kind of digital computer. In some embodiments, the processors can be selected according to the type of device.

Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. For example, a server can transfer nodal information, nodal analytics, and/or knowledge can be transferred to flash memory. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode), or OLED (organic light emitting diode) monitor, for displaying information to the user and a keyboard and a pointing device, e.g., a mouse or a trackball, by which the user can provide input to the computer. In some implementations, a touch screen can be used to display information and to receive input from a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

From the foregoing, it will be appreciated that specific embodiments have been described herein for purposes of illustration, but that various modifications may be made without deviating from the disclosed technology. The methods disclosed herein include and encompass, in addition to methods of making and using the disclosed devices and systems, methods of instructing others to make and use the disclosed devices and systems. For example, the operating instructions can instruct the user how to provide any of the operational aspects of the Figures discussed herein. In some embodiments, methods of instructing such use and manufacture may take the form of computer-readable-medium-based executable programs or processes. Moreover, aspects described in the context of particular embodiments may be combined or eliminated in other embodiments. Further, although advantages associated with certain embodiments have been described in the context of those embodiments, other embodiments may also exhibit such advantages, and not all embodiments need necessarily exhibit such advantages to fall within the scope of the presently disclosed technology.

We claim:

1. A solar tracker assembly comprising:
a base having a track, a centrally-positioned base member, a motor operably coupled to the base member, and a plurality of arms extending from the base member towards the track member, wherein the track comprises a plurality of arcuate members that are assembled to form the track;
a rotatable frame coupled to the arms, the rotatable frame including one or more towers and an actuator positioned on the one or more towers;
a pivoting frame coupled to the one or more towers, the pivoting frame configured to carry a solar panel array; and
tracker electronics operably coupled to the motor and the actuator,
wherein—
the motor rotates the base member and arms around a Z-axis to position the rotatable frame at azimuth,
the actuator moves the pivoting frame around an X-Y axis to position the pivoting frame at zenith,
the base further includes a plurality of foot plates for securing the base to a deployment site, and
the tracker electronics are configured to auto-level the tracker assembly to compensate for uneven placement of individual foot plates at the deployment site.

2. The assembly of claim 1 wherein:
the track has a surface;
a distal end of the arms includes wheels attached thereto;
the wheels engage and move with respect to the surface of the track during rotation; and
the wheels are configured to compensate for anomalies in the track after assembly of the arcuate members.

3. The assembly of claim 1 wherein the pivoting frame is coupled to the one or more towers with hinges.

4. The assembly of claim 3 wherein the actuator is a linear actuator that engages the pivoting frame such that the pivoting frames moves around a hinge point.

5. The assembly of claim 1 wherein the motor is a slew motor.

6. The assembly of claim 1, further comprising a solar panel array carried by the pivoting frame, and wherein the assembly is configured to position the solar panel array in line with the sun as it moves across the sky.

7. The assembly of claim 1 wherein the one or more towers include a plurality of frame members anchored to the arms and a plurality of bars interconnecting the frame members.

8. The assembly of claim 1, further comprising a sensor box operably coupled to the tracker electronics, the sensor box comprising one or more accelerometers and at least one other sensor.

9. The assembly of claim 8 wherein the other sensor includes at least one of a heat sensor, a light sensor, and a compass sensor.

* * * * *